US009792690B2

(12) United States Patent
Kinoshita et al.

(10) Patent No.: US 9,792,690 B2
(45) Date of Patent: Oct. 17, 2017

(54) SHAPE MEASUREMENT SYSTEM, IMAGE CAPTURE APPARATUS, AND SHAPE MEASUREMENT METHOD

(71) Applicants: Akira Kinoshita, Kanagawa (JP); Atsuo Kawaguchi, Kanagawa (JP); Shogo Ishida, Kanagawa (JP); Kazuki Tokoyoda, Kanagawa (JP)

(72) Inventors: Akira Kinoshita, Kanagawa (JP); Atsuo Kawaguchi, Kanagawa (JP); Shogo Ishida, Kanagawa (JP); Kazuki Tokoyoda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 14/735,463

(22) Filed: Jun. 10, 2015

(65) Prior Publication Data

US 2015/0373319 A1 Dec. 24, 2015

(30) Foreign Application Priority Data

Jun. 20, 2014 (JP) ................................ 2014-127017
Mar. 10, 2015 (JP) ................................ 2015-047144

(51) Int. Cl.
*H04N 13/02* (2006.01)
*G01B 11/24* (2006.01)
(Continued)

(52) U.S. Cl.
CPC ............ *G06T 7/0069* (2013.01); *G01B 11/24* (2013.01); *G01B 11/245* (2013.01); *G06T 7/571* (2017.01);
(Continued)

(58) Field of Classification Search
CPC ........... H04N 13/0203; H04N 13/0275; H04N 13/0282; H04N 13/0296; H04N 5/2253; H04N 5/2256; H04N 5/23296
See application file for complete search history.

(56) References Cited

U.S. PATENT DOCUMENTS 6,141,034 A * 10/2000 McCutchen ........... G02B 27/22 348/36
8,407,938 B2 * 4/2013 Faria ....................... E05D 15/00 220/254.2
(Continued)

FOREIGN PATENT DOCUMENTS

JP 2001-243497 9/2001
JP 2003-083727 3/2003
(Continued)

*Primary Examiner* — Tsion B Owens
(74) *Attorney, Agent, or Firm* — Oblon, McClelland, Maier & Neustadt, L.L.P.

(57) ABSTRACT

A shape measurement system includes one or more lighting units located in a case that illuminate a target object located in the case, one or more image capture units located in the case that capture an image of the target object, a holding unit that holds the image capture units and the lighting units so as to form a polyhedron shape approximating a sphere, a selector that selects at least one of the image capture units and at least one of the lighting units to be operated, and a shape calculator that calculates a 3-D shape of the target object based on image data captured by the selected image capture unit under light emitted by the selected lighting unit.

14 Claims, 12 Drawing Sheets

(51) Int. Cl.

| | |
|---|---|
| ***G06T 7/00*** | (2017.01) |
| ***G01B 11/245*** | (2006.01) |
| ***H04N 5/232*** | (2006.01) |
| ***H04N 5/225*** | (2006.01) |
| ***G06T 7/571*** | (2017.01) |
| ***G06T 7/586*** | (2017.01) |

(52) U.S. Cl.
CPC ........... *G06T 7/586* (2017.01); *H04N 5/2256* (2013.01); *H04N 5/23212* (2013.01); *G06T 2207/10016* (2013.01); *G06T 2207/10148* (2013.01)

(56) References Cited

U.S. PATENT DOCUMENTS 9,354,046 B2 * 5/2016 Tohara .................. G01B 11/25
2010/0195114 A1 * 8/2010 Mitsumoto .......... G01B 11/245 356/601
2011/0262007 A1 * 10/2011 Kojima ............. G01B 11/2509 382/103
2013/0128280 A1 * 5/2013 Kim .................. G01B 11/2531 356/601
2013/0129251 A1 5/2013 Ishii et al.
2013/0235385 A1 * 9/2013 Nakajima .......... G01B 9/02004 356/489
2013/0301929 A1 * 11/2013 Hossary ................ G01B 11/24 382/199
2014/0253514 A1 9/2014 Omura et al.

FOREIGN PATENT DOCUMENTS

| | | |
|---|---|---|
| JP | 2006-285763 | 10/2006 |
| JP | 2007-109234 | 4/2007 |
| JP | 2009-236696 | 10/2009 |
| JP | 2013-092878 | 5/2013 |
| JP | 2013-186100 | 9/2013 |

* cited by examiner 120
122
132
IMAGE CAPTURE LIGHTING CONTROLLER
136
SUB-MEMORY
POWER SUPPLY
MAIN MEMORY
DATA TRANSFER UNIT
130
134
138

160
INFORMATION PROCESSING APPARATUS
194
CALCULATION CONTROLLER
192
DATA TRANSFER UNIT
120
BOARD UNIT
138
DATA TRANSFER UNIT
132
IMAGE CAPTURE LIGHTING CONTROLLER
MAIN MEMORY
134
128
LIGHTING UNIT
126
IMAGE CAPTURE UNIT

132
IMAGE CAPTURE LIGHTING CONTROLLER
140
CONTROL DATA RECEIVER
146
3-D DATA TRANSMITTER
148
IMAGE CAPTURE UNIT AND LIGHTING UNIT SELECTOR
152
CONTROL DATA INPUT UNIT
154
3-D DATA ANALYZER
156
CONTROL DATA OUTPUT UNIT
150
3-D DATA INPUT UNIT
142
CONTROL DATA TRANSMITTER
144
3-D DATA RECEIVER
MAIN MEMORY
134

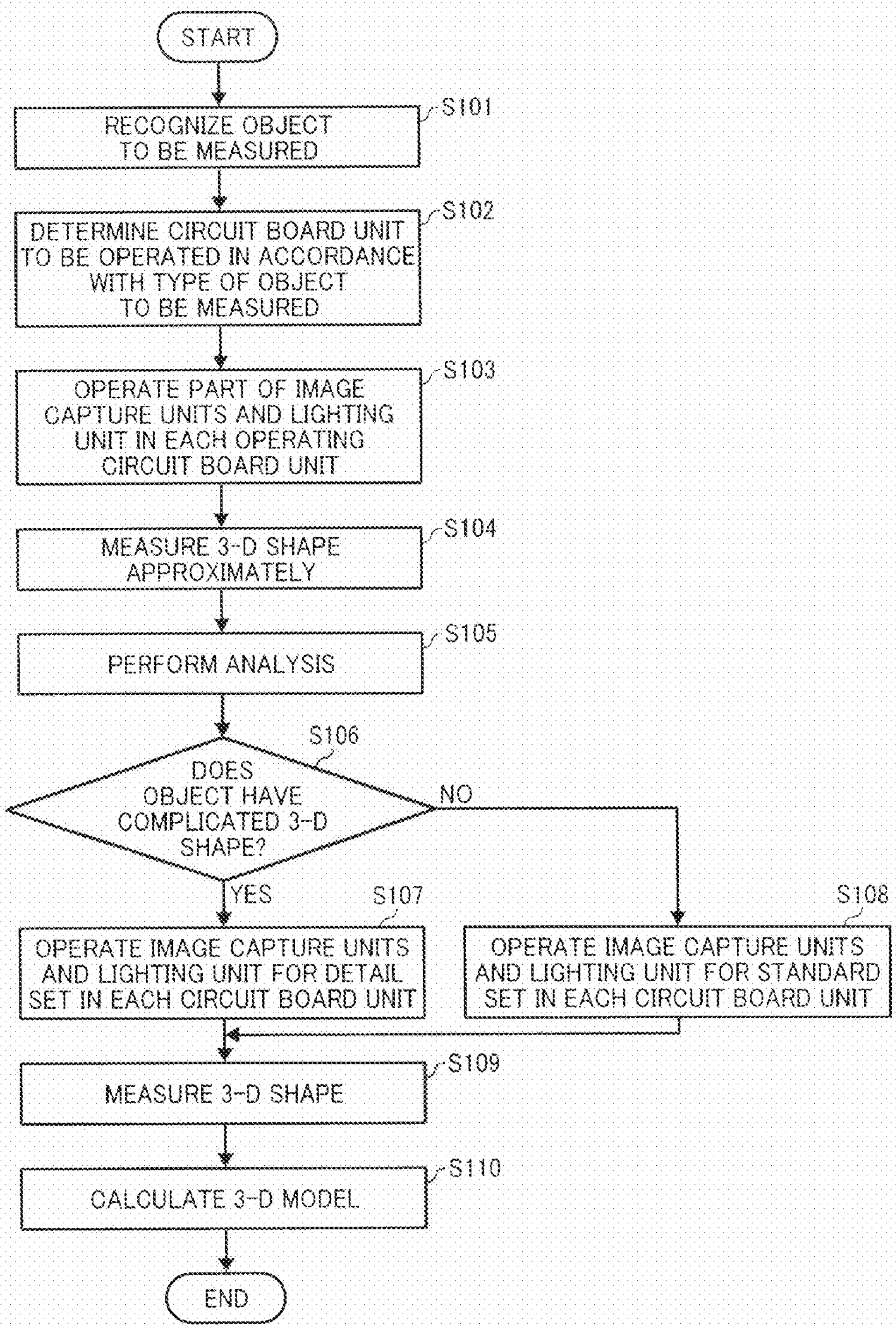
FIG. 8
START
RECOGNIZE OBJECT TO BE MEASURED
S101
DETERMINE CIRCUIT BOARD UNIT TO BE OPERATED IN ACCORDANCE WITH TYPE OF OBJECT TO BE MEASURED
S102
OPERATE PART OF IMAGE CAPTURE UNITS AND LIGHTING UNIT IN EACH OPERATING CIRCUIT BOARD UNIT
S103
MEASURE 3-D SHAPE APPROXIMATELY
S104
PERFORM ANALYSIS
S105
DOES OBJECT HAVE COMPLICATED 3-D SHAPE?
S106
NO
YES
OPERATE IMAGE CAPTURE UNITS AND LIGHTING UNIT FOR DETAIL SET IN EACH CIRCUIT BOARD UNIT
S107
OPERATE IMAGE CAPTURE UNITS AND LIGHTING UNIT FOR STANDARD SET IN EACH CIRCUIT BOARD UNIT
S108
MEASURE 3-D SHAPE
S109
CALCULATE 3-D MODEL
S110
END 160
INFORMATION PROCESSING APPARATUS
194
CALCULATION CONTROLLER
196
NORMAL LINE CALCULATOR
198
3-D SHAPE RESTORATION UNIT
192
DATA TRANSFER UNIT
120
BOARD UNIT
138
DATA TRANSFER UNIT
132
IMAGE CAPTURE LIGHTING CONTROLLER
134
MAIN MEMORY
128
LIGHTING UNIT
126
IMAGE CAPTURE UNIT 120
BOARD UNIT
127
DISTANCE CAMERA
128
LIGHTING UNIT
126
IMAGE CAPTURE UNIT
131
DEPTH-OF-FIELD CALCULATOR
132
IMAGE CAPTURE LIGHTING CONTROLLER
134
MAIN MEMORY
138
DATA TRANSFER UNIT
160
INFORMATION PROCESSING APPARATUS
192
DATA TRANSFER UNIT
194
CALCULATION CONTROLLER
195
IMAGE SYNTHESIZER
196
NORMAL LINE CALCULATION UNIT
198
3-D SHAPE RESTORATION UNIT

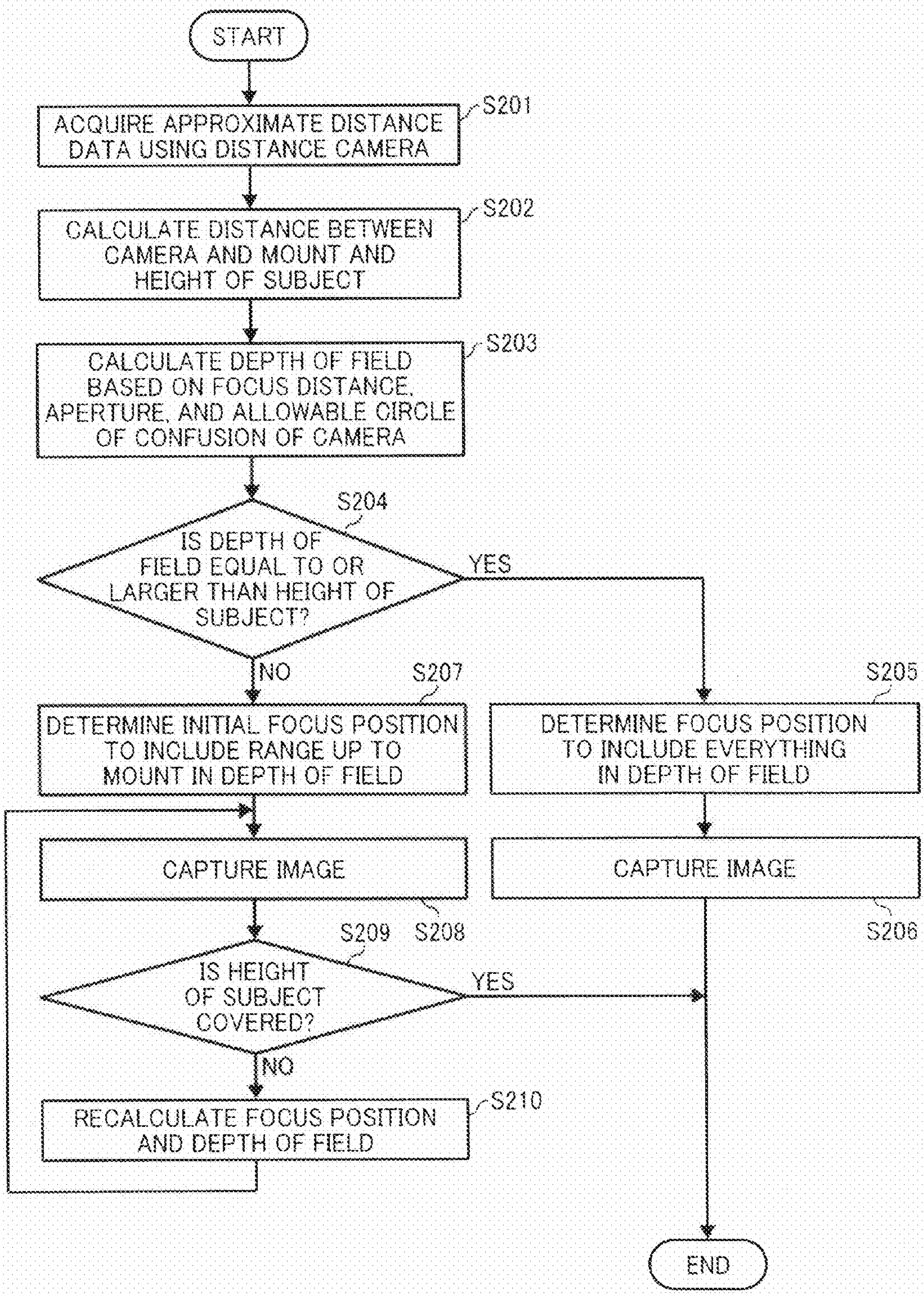
FIG. 13
START
ACQUIRE APPROXIMATE DISTANCE DATA USING DISTANCE CAMERA
S201
CALCULATE DISTANCE BETWEEN CAMERA AND MOUNT AND HEIGHT OF SUBJECT
S202
CALCULATE DEPTH OF FIELD BASED ON FOCUS DISTANCE, APERTURE, AND ALLOWABLE CIRCLE OF CONFUSION OF CAMERA
S203
S204
IS DEPTH OF FIELD EQUAL TO OR LARGER THAN HEIGHT OF SUBJECT?
YES
NO
S207
DETERMINE INITIAL FOCUS POSITION TO INCLUDE RANGE UP TO MOUNT IN DEPTH OF FIELD
S205
DETERMINE FOCUS POSITION TO INCLUDE EVERYTHING IN DEPTH OF FIELD
CAPTURE IMAGE
CAPTURE IMAGE
S209
S208
S206
IS HEIGHT OF SUBJECT COVERED?
YES
NO
RECALCULATE FOCUS POSITION AND DEPTH OF FIELD
S210
END

SHAPE MEASUREMENT SYSTEM, IMAGE CAPTURE APPARATUS, AND SHAPE MEASUREMENT METHOD

CROSS-REFERENCE TO RELATED APPLICATION

This patent application is based on and claims priority pursuant to 35 U.S.C. §119(a) to Japanese Patent Applications No. 2014-127017, filed on Jun. 20, 2014 and No. 2015-047144, filed on Mar. 10, 2015 in the Japan Patent Office, the entire disclosure of which is hereby incorporated by reference herein.

BACKGROUND

Technical Field

The present invention relates to a shape measurement system, an image capture apparatus, and a shape measurement method.

Background Art

Recently, apparatuses that measure a complete 3-D shape of a target object to recognize the target object three-dimensionally have been developed. Such an apparatus uses images captured from multiple different directions. In this case, the images are captured by rotating the target object or moving the measurement apparatus itself around the target object.

However, in such 3-D shape measurement apparatuses, it is only possible to capture a 3-D model of the surface facing the image capture apparatus at the time. As a result, to acquire the complete 3-D model, it is necessary to rotate the target object or move the image capture apparatus around, which is time-consuming and cumbersome.

SUMMARY

An example embodiment of the present invention provides a novel shape measurement system includes one or more lighting units located in a case that illuminate a target object located in the case, one or more image capture units located in the case that capture an image of the target object, a holding unit that holds the image capture units and the lighting units so as to form a polyhedron shape approximating a sphere, a selector that selects at least one of the image capture units and at least one of the lighting units to be operated, and a shape calculator that calculates a 3-D shape of the target object based on image data captured by the selected image capture unit under light emitted by the selected lighting unit.

Further example embodiments of the present invention provide an image capture apparatus and a shape measurement method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 8 is a flowchart illustrating a 3-D shape measuring process executed by the 3-D shape measurement system as an embodiment of the present invention.

FIG. 13 is a flowchart illustrating an image capture process for an omnifocal image executed by the 3-D shape capture apparatus as the preferable embodiment.

DETAILED DESCRIPTION

Figure 1:
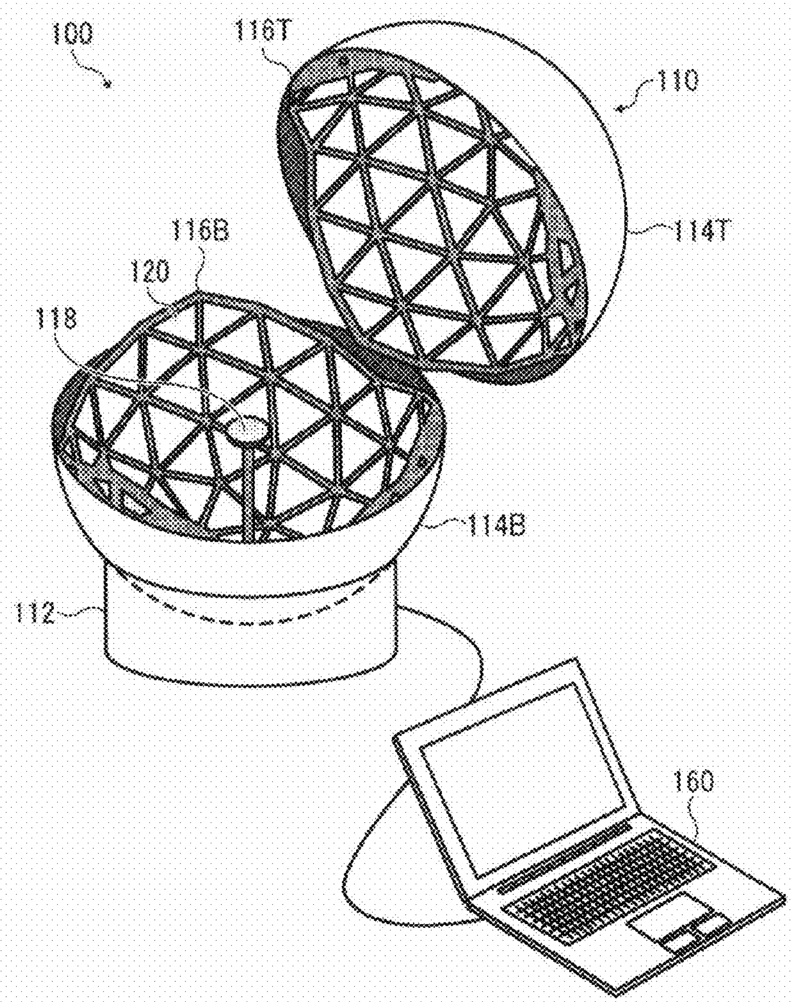
FIG. 1 is a diagram illustrating a schematic configuration of a 3-D shape measurement system and a 3-D shape capture apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the description below, a 3-D shape measurement system and a 3-D shape capture apparatus are taken as examples of a shape measurement system and an image capture apparatus.

In existing technologies, a mechanism that controls an image capture unit or a lighting unit dynamically in accordance with a target object is not included. As a result, in case of increasing the number of the image capture units and lighting units, it is desired to measure the 3-D shape by using all image capture units and lighting units, and that is insufficient. Depending on the target object, fewer image capture units and fewer lighting units are enough. In those cases, it takes more time for the measurement and power consumption increases by operating more image capture units and lighting units than required. In addition, by using existing apparatus, it is impossible to capture an image from the bottom surface, and it is impossible to measure the 3-D shape of the target object from all directions.

FIG. 1 is a diagram illustrating a schematic configuration of a 3-D shape measurement system and a 3-D shape capture apparatus in this embodiment. A 3-D shape measurement system 100 in FIG. 1 includes a 3-D shape capture apparatus 110 and an information processing apparatus 160 connected to the 3-D shape capture apparatus 110. The 3-D shape capture apparatus 110 is connected to the information processing apparatus 160 via a wired or wireless communication channel such as wired Local Area Network (LAN), wireless LAN, wired Universal Serial Bus (USB), wireless USB, and Bluetooth.

The 3-D shape capture apparatus 110 captures the target object from multiple viewpoints in all directions en block to measure the 3-D shape of the object to be measured (hereinafter referred to as "target object"). In a case of the 3-D shape capture apparatus 110, a base 112, a lightproof dome 114 that blocks light from outside environment, a geodesic-dome-shaped board frame 116, an object table 118 on which the target object is mounted, and multiple board units 120 fixed to the board frame 116.

In this embodiment, the board unit 120 is mounted on the board frame 116 to capture the image of the target object located inside the case. The board unit 120 includes one or more lighting units and one or more image capture units. After mounting the board unit 120 on the board frame 116 appropriately, the board unit 120 is configured so that the lighting units and the image capture units in the board unit 120 face to the target object located at a predetermined position on the object table 118.

The board frame 116 is included in the case, and the board frame 116 holds the board unit 120 so that the image capture units and the lighting units described above are located in the geodesic-dome shape. After all board units 120 are mounted on predetermined positions of the board frame 116, the board frame 116 is configured so that images of the target object located on the object table 118 are captured from multiple viewpoints in all directions and 3-D information is acquired from all directions.

The lightproof dome 114 includes a top hemisphere 114T and a bottom hemisphere 114B that fit together to contain the board frame 116. In accordance with the divided lightproof dome 114, the board frame 116 described above is divided into a top board frame 116T corresponding to the top hemisphere 114T and a bottom board frame 116B corresponding to the bottom hemisphere 116B. Preferably, the lightproof dome 114 is configured so that it can block light from outside after fitting the top hemisphere 114T and the bottom hemisphere 114B together. In addition, preferably, inner surfaces of the lightproof domes 114T and 114B are matted or painted in black so that inside reflection of light is reduced. In addition, the lightproof dome 114 is configured so that cables such as a power cable and a communication cable from the board unit 120 can be drawn from the case. It should be noted that shape of the lightproof dome 114 is not limited to a sphere as shown in FIG. 1 but can be other shapes as appropriate.

The object table 118 is a table for locating the target object at a predetermined position (e.g., the center of the geodesic dome). Preferably, the object table 118 is configured so that its size becomes minimum in accordance with the size of the target object to avoid interfering with capturing images from the bottom board frame 116B corresponding to the bottom sphere 114B as far as possible. In addition, while the material of the object table 118 is not specified, the object table 118 can be constructed from transparent material so that the target object is not hidden from the image capture unit. Furthermore, height of the object table 118 can be changed in accordance with the size of the target object. Furthermore, the object table 118 is not limited to the table with a column, and the object table 118 can be underslung.

The information processing apparatus 160 is connected to the 3-D shape capture apparatus 110, sets various parameters of the 3-D shape capture apparatus 110 such as capturing condition and lighting condition etc., receives 3-D information (including images captured from multiple viewpoints) that the 3-D shape capture apparatus 110 acquires, calculates the 3-D shape, and generates a 3-D model. In addition, the information processing apparatus 160 can restore an image of the target object observed from a predetermined viewpoint virtually based on the generated 3-D model and display it on a display that the information processing apparatus 160 includes. It is also possible to restore a 3-D image on a stereoscopic display.

Figure 2:
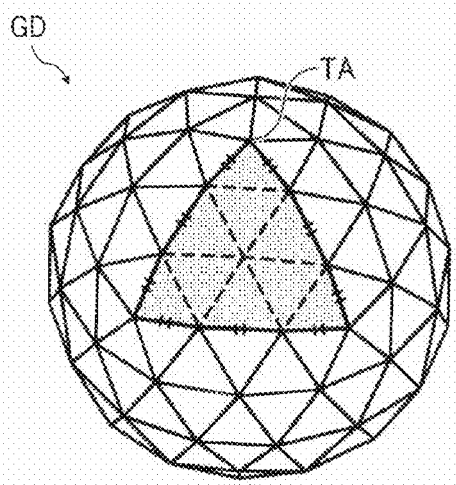
FIG. 2 is a diagram illustrating a geodesic dome shape that a board frame in FIG. 1 includes as an embodiment of the present invention.

FIG. 2 is a diagram illustrating the geodesic-dome shape that the board frame 116 in FIG. 1 includes in this embodiment. Based on a polyhedron such as a regular polyhedron such as a regular dodecahedron and regular icosahedron or a semi-regular polyhedron such as a truncated icosahedron (including polyhedrons that is convex and uniform other than regular polyhedrons), the geodesic dome is a dome structure that includes a polyhedral shape approximating a sphere constructed by projecting vertexes generated by dividing regular polygons that comprises the polyhedron into pieces more than two maintaining symmetry as far as possible on a circumscribed sphere. Based on the icosahedron, the geodesic-dome shape GD in FIG. 2 is generated by dividing three sides of regular triangles TA that comprises the icosahedron equally among three and projecting vertexes of divided nine regular triangles on the circumscribed sphere.

In FIG. 2, there are 180 sides in total since twenty regular triangles on the icosahedron are further divided into nine pieces. In the embodiment shown in FIGS. 1 and 2, a configuration in which one or more image capture units and one or more lighting units are located on the geodesic-dome shape can be implemented by putting the board units 120 on each side of the board frames 116T and 116B that comprise the 180-hedron in total. The embodiment is not limited to the case described above particularly, and it is possible to implement the configuration by mounting sub-frames with nine triangle board units 120 on each side of the board frames 116T and 116B that comprises the icosahedron in total.

As described above, by putting the board units 120 on the sides of the geodesic-dome shape, it is possible to locate all image capture units and all lighting units at positions with equal distance from the target object and uniform density without embracing large amount of cost.

In the 3-D shape measurement, it is preferable that all image capture units and all lighting units are located at positions with uniform density and equal distance from the target object. By adopting the geodesic-dome shape in FIGS. 1 and 2, it is possible to implement the shape approximating the sphere that is difficult to construct costwise actually and locate the lighting units and the image capture units evenly. In addition, in the geodesic-dome shape in FIGS. 1 and 2, it is possible to implement the configuration without opened side. Therefore, it is possible to capture images from viewpoint in all directions and block outside light that enters into the 3-D shape measurement apparatus.

Figure 3:
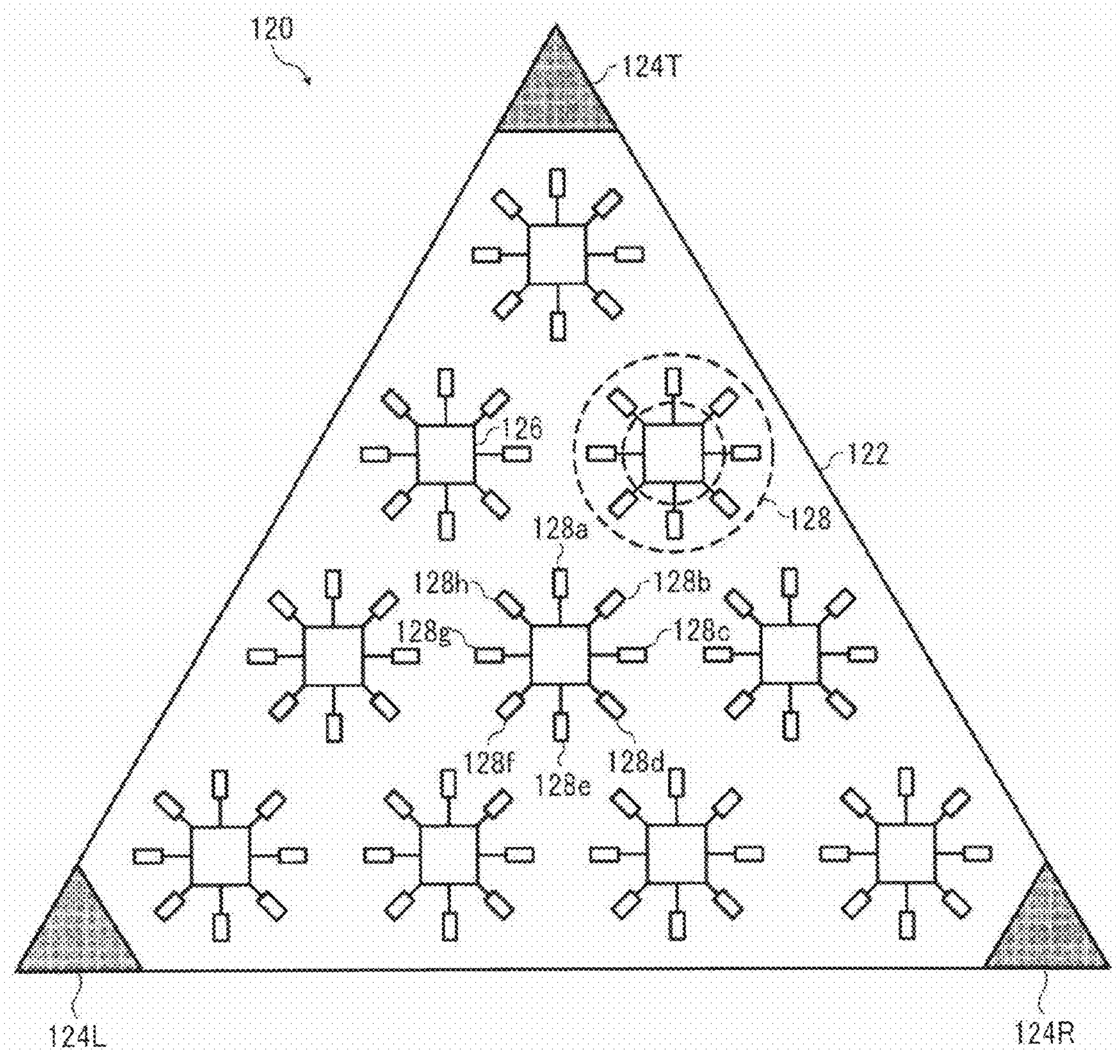
FIG. 3 is a diagram illustrating a surface of a board unit (where an image capture unit and a lighting unit are located) as an embodiment of the present invention.

FIG. 3 is a diagram illustrating a surface of the board unit 120 (where an image capture unit and a lighting unit are mounted and face the target object) in this embodiment. The board unit 120 includes a board 122, a board mount 124 to be mounted on the board frame 116, one or more image capture units 126 that capture images to acquire the 3-D information of the target object, and one or more lighting units 128 for illuminating the target object.

Joint members such as screws are located on the board mount 124, and the board mount 124 is used for mounting the board unit 120 on the predetermined position of the board frame 116. In FIG. 3, board mounts 124T, 124L, and 124R are located on three corners of the triangle board 122. The image capture unit 126 includes a solid-state image sensor such as a Complementary Metal Oxide Semiconductor (CMOS) image sensor. In FIG. 3, ten image capture units 126 are located on the board 122 in total. The light unit 128 includes a light emitting element such as Light Emitting Diode (LED) and Organic Light Emitting Diode (OLED). In FIG. 3, ten lighting units 128 are located on the board 122 surrounding the ten image capture units 126 located.

Each of the multiple image capture units 126 operates independently. For example, in case of operating all image capture units 126 included in all board units 120 concurrently, it is possible to acquire the 3-D information of the target object from multiple viewpoints in all directions at the maximum precision. In addition, for objects that do not need to be measured from the bottom, such as a picture, it is possible to acquire the 3-D information from the viewpoint of the upper hemisphere by operating only the image pickup units 126 located on the board unit 120 mounted on the upper board frame 116T, thereby conserving resources.

In addition, it is possible to operate some of the multiple image capture units 126 included in the board unit 120 selectively. For example, in case of operating all board units 120, it is possible to operate one image capture unit only located at the center among multiple image capture units 126 included in each board unit 120. Furthermore, it is possible to modify the number and position of the selected image capture units 126 for each of board unit 120.

The number of the image capture units 126 on one board unit 120 is not limited. In FIG. 3, 10 image capture units are located, and it is possible to adopt other numbers such as 1, 6, and 15. In addition, it is preferable to locate multiple image capture units 126 at even density. However, the configuration is not limited to the pyramid shape. For example, it is possible to locate one image capture unit 126 at the center only. In addition, the image capture unit 126 can capture monochrome images or color images, and the image capture unit 126 can capture still images or videos. Furthermore, preferably, it is possible to use a Time of Flight (TOF) camera that acquire distance information in addition to image information as the image capture unit 126 for example. By using the TOF camera, it is possible to acquire the distance information from the image capture unit 126 to the target object in addition to the image information.

Each of the multiple lighting units 128 operates independently. More specifically, the lighting unit 128 in FIG. 3 includes eight lighting devices 128*a* to 128*h* (each of the lighting devices is LED element etc.) surrounding each image capture unit 126. Each of the lighting devices 128*a* to 128*h* operates independently.

Each of the lighting devices 128*a* to 128*h* that comprise the lighting unit 128 has same or different luminescence wavelength and same or different luminous intensity. For example, by operating the image capture unit 126 turning on the red lighting devices (e.g., 128*b* and 1280 only among the lighting devices 128*a* to 128*h* that comprise the lighting unit 128, it is possible to acquire the 3-D information under the red lighting condition. That is, it is possible to select the lighting wavelength and adjust the lighting tone.

The number of the lighting unit 128 on one board unit 120 and the number of lighting parts comprising the lighting unit 128 are not particularly limited. In FIG. 3, ten lighting units 128 are located just like the image capture unit 126. However, the number of the lighting units 128 can be four, six, or other numbers. In addition, the layout of the lighting units 128 is not limited to the pyramid shape in FIG. 3. It is also not limited that the lighting parts 128*a* to 128*h* in the lighting unit 128 are located in circumference shape around the image capture unit 126.

For example, it is also possible that one lighting unit 128 is located in the center for each of three image capture units 128 in FIG. 3 and the image capture unit 126 is configured as the board unit 120 that includes ten image capture units 126 and six lighting devices. In addition, it is possible to remove the image capture unit from the center of the board unit 120 and lay out the lighting unit at the place where the image capture unit existed. It is also possible that either the image capture unit 126 or the lighting unit 128 is located on one board unit 120.

The lighting unit 128 is not limited to one that includes LEDs. It is possible that the lighting unit 128 includes a projector (a liquid crystal panel and an expansion optical system) or a laser diode element. In case of using the projector in the lighting unit 128, it is possible to emit light arbitrarily such as pattern light with predetermined shape. In case of using the laser diode element, by emitting light into the target objet narrowing beam angle and enhancing luminous intensity, it is possible to use it as a marker in calculating the 3-D shape. Furthermore, it is not limited that the lighting unit 128 is a simple type of light source, and it is possible that the lighting unit 128 consists of a combination of at least two of the LED element, the projector, and the laser diode element.

Figure 4:
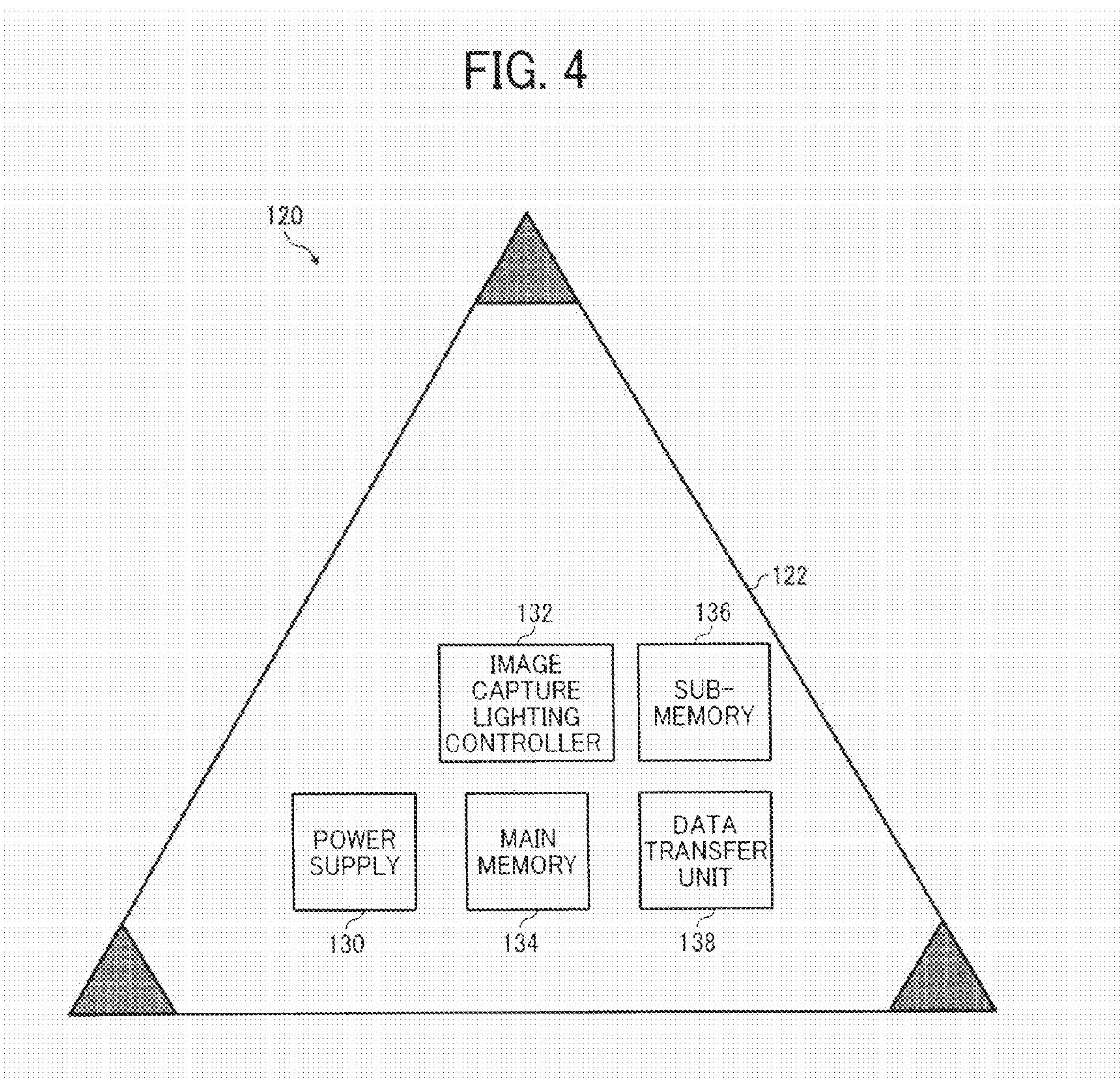
FIG. 4 is a diagram illustrating a backside of a board unit (opposite to the side where an image capture unit and a lighting unit are located) as an embodiment of the present invention.

FIG. 4 is a diagram illustrating a backside of the board unit 120 (opposite to the side where the image capture unit and the lighting unit are located) in this embodiment. The board unit 120 includes a power supply 130, an image capture lighting controller 132 that control the image capture unit 126 and the lighting unit 128, a main memory 134 that provides a primary storage area for the image capture lighting controller 132, a sub-memory 136 that provides a secondary storage area for the image capture lighting controller 132, and a data transfer unit 138 that communicates the board unit 120 with the external information processing apparatus 160 to receive/transfer control data and the measured 3-D information.

The power supply 130 supplies power to each of units 132 to 138 for the operation. The image capture lighting controller 132 is implemented by a processor unit that includes a CPU and a microprocessor and a Field Programmable Gate Array (FPGA) and the combination of those units (including an embedded FPGA that includes a processor core). The main memory 134 is implemented by memories such as a Synchronous Dynamic Random Access Memory (SDRAM) etc. The sub-memory 136 is implemented by devices such as a SD card, a flash memory, and a Solid State Drive (SSD) etc. The data transfer unit 138 is implemented by interface cards such as a Network Interface Card (NIC), USB 2.0, and USB 3.0 etc.

In FIG. 4, the processor that comprises the image capture lighting controller 132 reads control programs such as an operating system stored in the sub-memory 136 and expands them into a work area that the main memory 134 provides, and all or fewer than all of functional units and processes in the image capture lighting controller 132 (described later) can be implemented. In addition, the programmable logic device that comprises the image capture lighting controller 132 reads bit stream data stored in the sub-memory 136 and expands it into a configuration memory, and all or fewer than all of functional units and processes can be implemented. Otherwise, all or fewer than all of functional units and processes can be implemented as a specific circuit such as the ASIC.

The configuration in FIG. 4 is an example, and functions can be consolidated and devices can be reduced as far as functions are implemented. For example, if it is possible to acquire a control program for starting the image capture lighting controller 132 via the data transfer unit 138 using a network and boot the control program, it is not always desired to include the sub-memory 136. In addition, the sub-memory 136 is not always desired in case of using the FPGA product that includes sufficient nonvolatile memory.

Figure 5:
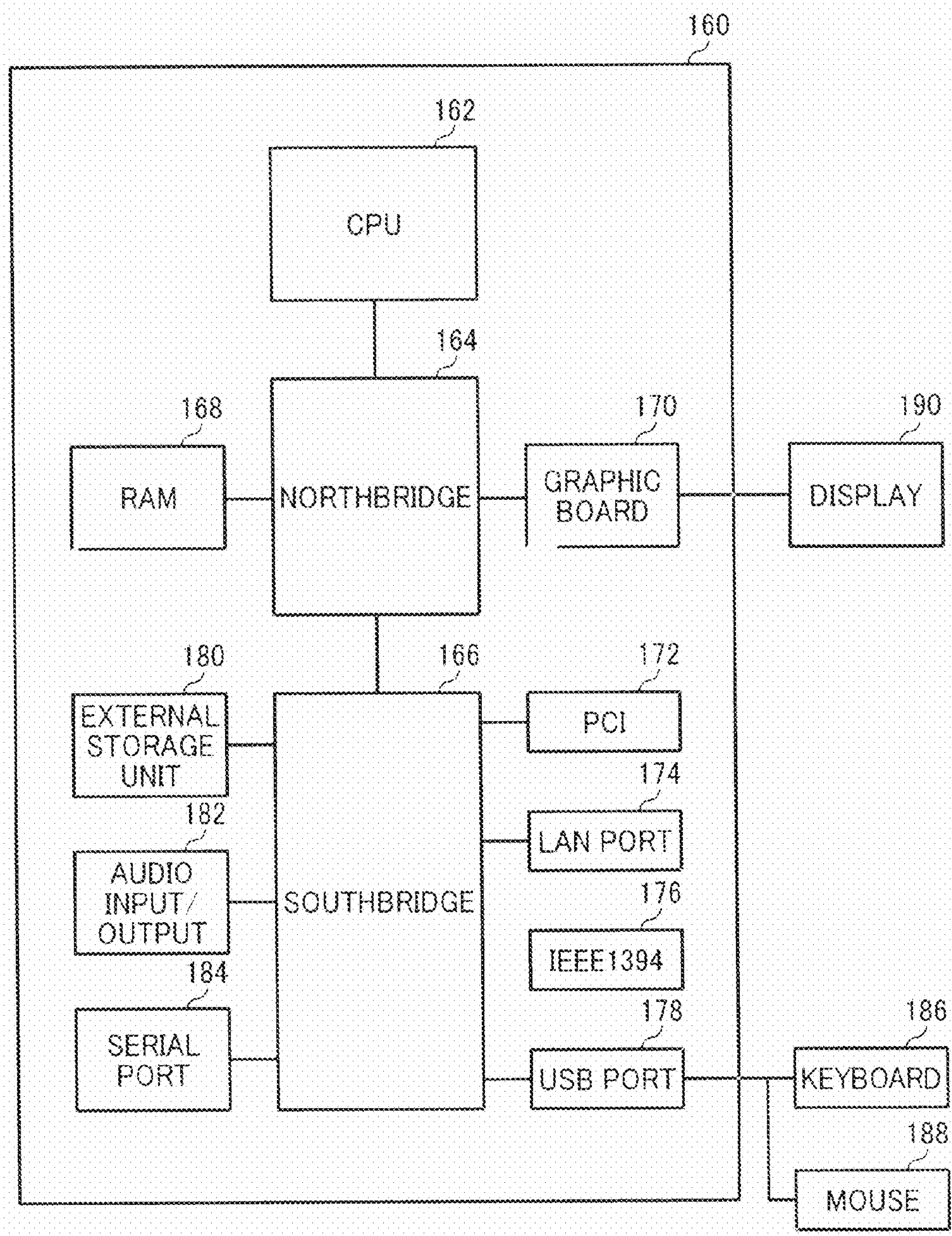
FIG. 5 is a diagram illustrating a hardware configuration of an information processing apparatus as an embodiment of the present invention.

FIG. 5 is a diagram illustrating a hardware configuration of the information processing apparatus 160 in this embodiment. The information processing apparatus 160 in this embodiment is implemented as a personal computer of a notebook, tablet, and desktop or a generic computer such as a workstation. The information processing apparatus 160 in FIG. 5 includes a single-core (or multi-core) CPU 162, a northbridge 164 that connects the CPU 162 with the memory, and a southbridge 166 that is connected to the northbridge 164 via a dedicated bus or a PCI bus and connects I/Os such as a Peripheral Component Interconnect (PCI) bus and the USB etc.

A RAM 166 that provides a work area for the CPU 162 and a graphic board 170 that outputs a video signal are connected to the northbridge 164. The graphic board 170 is connected to the display 190 via a video output interfaces such as analog RGB, High-definition Multimedia Interface (HDMI), Digital Visual Interface (DVI), and DisplayPort etc.

A PCI 172, a LAN port 174, an IEEE 1394 port 176, a USB port 178, an external storage unit 180 such as a hard disk drive (HDD) and a solid state drive (SSD), an audio input/output 182, and a serial port 184 are connected to the southbridge 166. The external storage unit 180 stores an operating system (OS) for controlling the information processing apparatus 160, a control program for implementing functional units (described later), various systems, and various configuration information. The LAN port 174 is an interface unit that connects the information processing apparatus 160 with the 3-D shape capture apparatus 110 via the network such as the LAN.

It is possible that input devices such as a keyboard 186 and a mouse 188 are connected to the USB port 178 to provide a user interface for accepting various user operations on the information processing apparatus 160. The information processing apparatus 160 in this embodiment reads a control program from the external storage unit 160 and expands it into the work area provided by the RAM 168 to implement functional units and processes (described later) under the control of the CPU 162.

Figure 6:
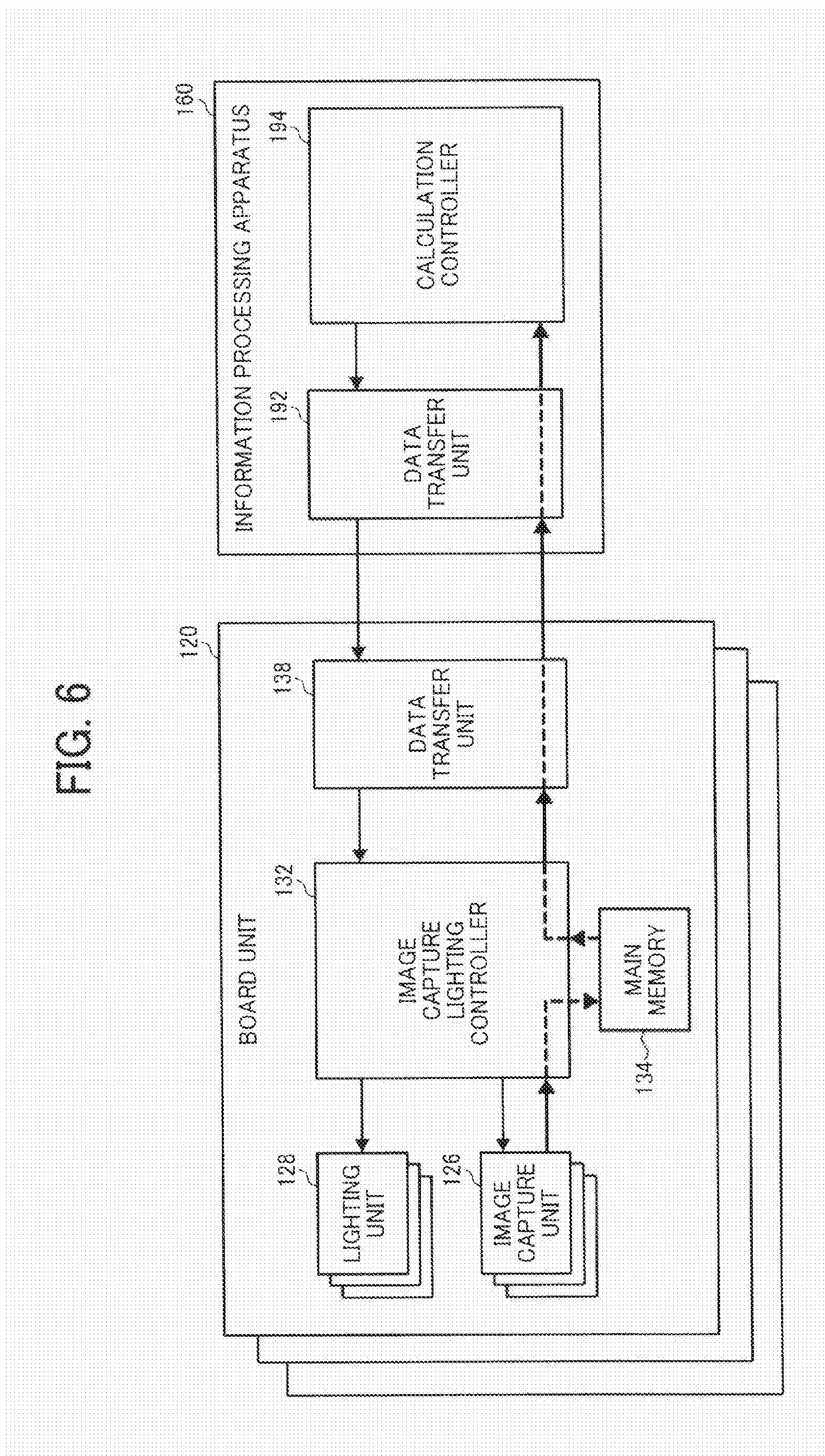
FIG. 6 is a diagram illustrating main components and data flow regarding 3-D shape measurement on each board unit of the 3-D shape capture apparatus and the information processing apparatus as an embodiment of the present invention.

A basic architecture of 3-D shape measurement in the 3-D shape measurement system 100 in this embodiment is described below with reference to FIG. 6. FIG. 6 is a diagram illustrating main components and data flow regarding 3-D shape measurement on each board unit 120 of the 3-D shape capture apparatus 110 and the information processing apparatus 160 in this embodiment. In FIG. 6, narrow arrows indicate flow of control information, and wide arrows indicate flow of measured 3-D information (including captured images).

One or more image capture units 126, one or more lighting units 128, the image capture lighting controller 132, the main memory 134, and the data transfer unit 138 are illustrated in FIG. 6 as main components on the board unit 120. Similarly, a data transfer unit 192 and a calculation controller 194 are illustrated in FIG. 6 as main components on the information processing apparatus 160.

The data transfer unit 192 in the information processing apparatus 160 communicates the information processing apparatus 160 with the external 3-D shape capture apparatus 110 to transfer/receive control data and the measured 3-D information. The data transfer unit 192 is implemented by interfaces such as the LAN port 174 or the USB port 178 shown in FIG. 5.

The calculation controller 194 in the information processing apparatus 160 controls the operation of the 3-D shape capture apparatus 110 and performs control and calculation for measuring 3-D shape of the target object controlling each of the image capture units 126 and the lighting units 128 in all board units 120. Typically, the CPU 162 expands the control program stored in the external storage unit 180 into the work area in the RAM 168, and the calculation controller 194 can be implemented.

A basic operation of the 3-D shape measurement system 100 in this embodiment is described below. The calculation controller 194 in the information processing apparatus 160 determines the image capture unit 126 and the lighting unit 128 to be operated and transfers control data to the image capture lighting controller 132 in the board unit 120 via the data transfer unit 192 in the information processing apparatus 160 and the data transfer unit 138 in the board unit 120. The control data includes data such as whether or not the board unit 120 becomes ready to operate, whether the image capture unit 126 or the lighting unit 128 in the board unit 120 is in the operating state, and which lighting part in the lighting unit 128 is to be operated.

In each of the board units 120, after operating the specified lighting unit 128 based on the received control data, the image capture lighting controller 132 performs capturing images operating the specified image capture unit 126. In each of the board units 120, one or more captured images are transferred to the main memory 134 and written in the main memory 134 temporarily. Subsequently, the image capture lighting controller 132 reads one or more captured images, composes 3-D information, and transfers it to the data transfer unit 192 in the subsequent information processing apparatus 160 via the data transfer unit 138. The calculation controller 194 reads the transferred 3-D information, and the 3-D shape is calculated based on the 3-D information from all operated board units 120 to restore the 3-D model. The calculation controller 194 comprises a shape calculator that calculates the 3-D shape of the target object based on the captured image information.

Processes that the calculation controller 194 generates the 3-D model from the multiple captured images and generates a display image based on the generated 3-D model are not described in detail, and known methods can be used for implementing those processes.

In capturing images, the image capture lighting controller 132 controls the image capture unit 126 and the lighting unit 128 to be operated based on the control data output by the calculation controller 194 and acquires the 3-D information. The calculation controller 194 sends reply by the control data in response to the received 3-D data and transfers new control data to the image capture lighting controller 132 if necessary in accordance with the calculating result.

Here, the control data that the calculation controller 194 specifies the image capture unit 126 and the lighting unit 128 to be operated firstly can be generated based on arbitrary information specified by user operation for example. In a preferable embodiment, it is possible to determine the image capture unit 126 and the lighting unit 128 to be operated based on the analysis result of the image capture lighting controller 132 in the board unit 120. A method of determining the image capture unit 126 and the lighting unit 128 to be operated is described in detail later.

In the embodiment shown in FIGS. 1 and 6, the calculation controller 194 that generates the 3-D model from the acquired 3-D shape information and texture information is configured in the information processing apparatus 160 separated from the image capture lighting controller 132 that controls the image capture unit 126 and the lighting unit 128. The configuration described above can be adopted preferably if calculation performance of the image capture lighting controller 132 in the board unit 120 is not adequate. However, the configuration is not limited to the case described above. For example, if the calculation performance of the image capture lighting controller 132 is adequate, it is possible to configure the function of the image capture lighting controller 132 and the function of the calculation controller 194 that generates the 3-D model shown in FIG. 6 in an integrated fashion.

A process of determining image capture unit 126 and lighting unit 128 to be operated and performing 3-D measurement in the 3-D shape measurement system 100 in this embodiment is described in detail below with reference to FIGS. 7 and 8.

Figure 7:
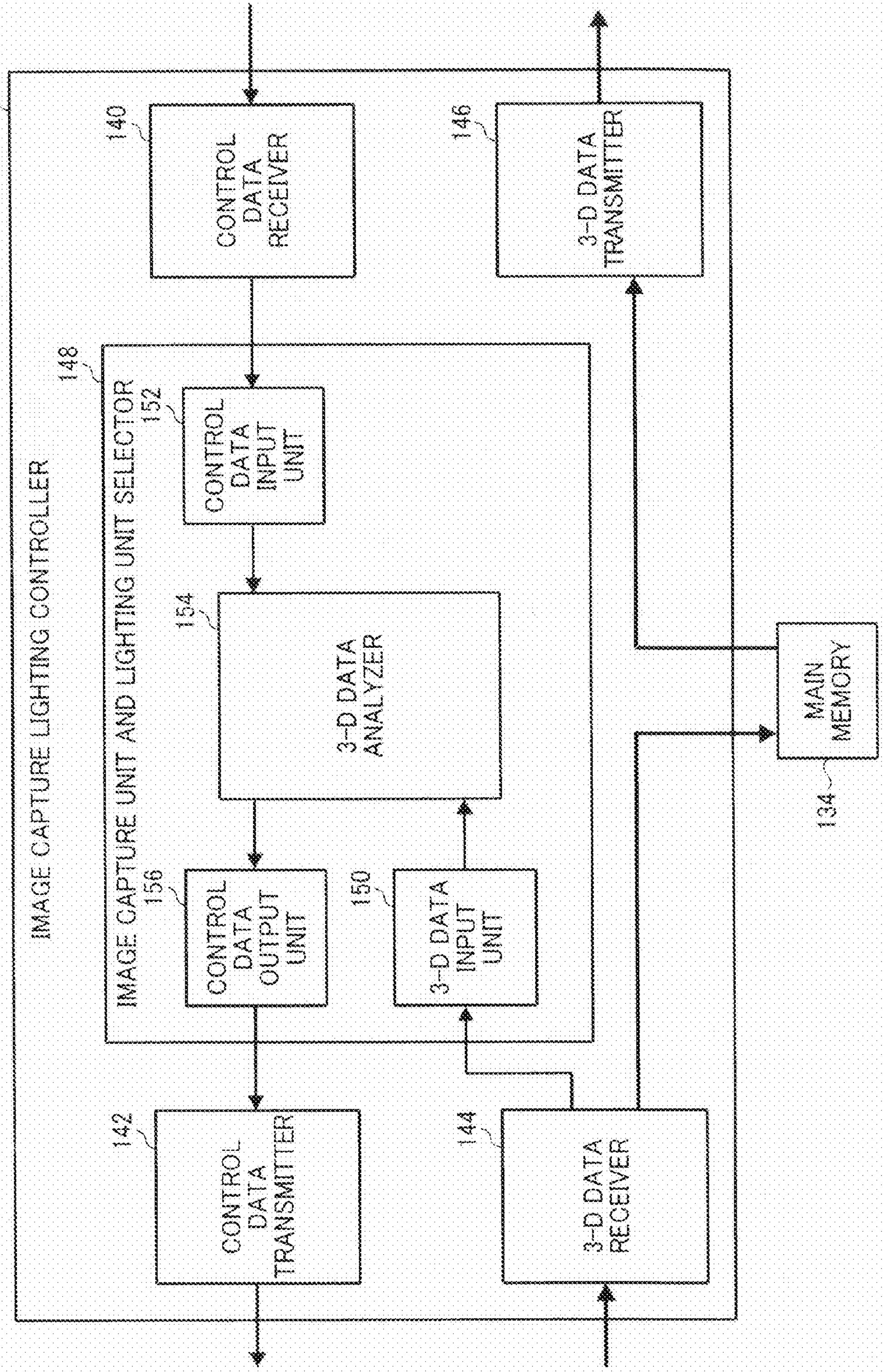
FIG. 7 is a diagram illustrating detailed functional blocks of an image capture and lighting controller as an embodiment of the present invention.

FIG. 7 is a diagram illustrating detailed functional blocks of the image capture lighting controller 132 in this embodiment. The image capture lighting controller 132 in FIG. 7 includes a control data receiver 140, a control data transmitter 142, a 3-D data receiver 144, a 3-D data transmitter 146, and an image capture unit and lighting unit selector 148.

The control data receiver 140 receives control data from the data transfer unit 138 in the board unit 120. The control data transmitter 142 transfers the control data received by the control data receiver 140 or the control data based on the analysis result of the 3-D data to one or more image capture units 126 and one or more lighting units 128 to operate each of the image capture unit 126 and the lighting unit 128.

The 3-D data receiver 144 receives 3-D data (including one or more captured images) captured by one or more image capture units 126. The received 3-D data is written in the main memory 134 temporarily. The 3-D data transmitter 146 reads the received 3-D data from the main memory 134 and transfers it to the data transfer unit 138.

Based on at least any one of the 3-D data received by the 3-D data receiver 144, the 3-D data acquired by another unit, and the control data received by the control data receiver 140, the image capture unit and lighting unit selector 148 selects the image capture unit and lighting unit (their numbers and positions) among one or more image capture units 126 and one or more lighting units included in the board unit 120 and passes the control data to the control data transmitter 142 to transfer it to the image capture unit and the lighting unit.

The image capture unit and lighting unit selector 148 analyzes the acquired 3-D data and selects the image capture unit 126 and the lighting unit 128 to be operated dynamically. As a result, the 3-D shape capture apparatus 110 can modify the number of the image capture units 126 and lighting units 128 to be operated in accordance with the target object and provide satisfactory 3-D shape measurement.

In FIG. 7, detailed functional blocks of the image capture unit and lighting unit selector 148 in this embodiment are illustrated. More specifically, the image capture unit and lighting unit selector 148 includes a 3-D data input unit 150, a control data input unit 152, a 3-D data analyzer 154, and a control data output unit 156.

The 3-D data input unit 150 accepts 3-D data from the 3-D data receiver 144 and passes it to the 3-D data analyzer 154. After accepting input of the control data (transferred from the information processing apparatus 160) from the control data receiver 140 and passes it to the 3-D data analyzer 154.

After receiving the input control data and the input 3-D data, the 3-D data analyzer 154 analyzes the received 3-D data and the received control data, generates control data for the image capture units 126 and the lighting units 128 based on the analysis result, and passes it to the control data output unit 156. The control data output unit 156 outputs the control data generated by the 3-D data analyzer 154 to the control data transmitter 142.

To determine the image capture units and the lighting units to be operated (their numbers and positions), the 3-D data analyzer 154 analyzes the 3-D data of the target object acquired by the image capture unit 126 or other methods. That is, after the analysis by the 3-D data analyzer 154, if it is determined that it is possible to acquire the adequate 3-D data of the target object with less number of the image capture units 126 to be operated, it is possible to reduce the number of the image capture units 126 to be operated in the actual measurement. Similarly, after the analysis by the 3-D data analyzer 154, if it is determined that it is possible to acquire the adequate 3-D data of the target object with less number of the lighting units 126 to be operated, it is possible to reduce the number of the image capture units 126 to be operated in the actual measurement. The image capture units 126 and lighting units 128 included in each of the board units 120 can be controlled in the way described above. For example, it is possible to operate three image capture units 126 and fine lighting units 128 to capture images of a relatively complex part of the target object in one board unit 120, and it is possible to operate one image capture unit 126 and one lighting unit 128 to capture images of relatively simple part of the target object in another board unit 120.

In determining how much 3-D data is adequate to acquire, it is possible to determine that based on the control data transferred from the information processing apparatus 160. For example, regarding the lighting, in case of accepting threshold and range against indexes to measure image quality such as contrast of the acquired images as the control data, it is possible to increase the number of the lighting units 128 to be operated or reduce the number of the lighting units 128 to control lighting depending on whether or not the index gets larger than the threshold or the index falls within the range. In addition, regarding the image capture, in case of accepting threshold and range against indexes to measure complexity of images and 3-D shape, it is possible to increase and reduce the number of the image capture unit 126 to be operated depending on whether or not the index gets larger than the threshold or the index falls within the range.

In addition, it is possible to determine in the way described below. By capturing images temporarily using photometric stereo method, shade data of the target object is acquired. In that case, by capturing images with rough density, the complexity of the target object is estimated by measuring the shade. If the shade is complex and fine, then it is predicted that the shape of the target object is complex, and it is possible to increase the number of the image capture unit 126 to be driven in the measurement. In addition, by capturing images temporarily using space coding method instead of the photometric stereo method, it is possible to acquire the shade data of the target object. Furthermore, in other embodiments, it is possible to determine that based on user experience from the shape of the target object.

A specific example of determining the image capture unit 126 and the lighting unit 128 to be operated and performing 3-D measurement is described below with reference to FIG. 8. FIG. 8 is a flowchart illustrating a 3-D shape measuring process executed by the 3-D shape measurement system in this embodiment. The process in FIG. 8 starts after instructing to start measuring on the information processing apparatus 160 by user operation.

In S101, the target object is recognized. For example, the calculation controller 194 first captures images of the target object roughly by operating the small number of image capture units and the lighting units and categorizes the target object by performing pattern matching etc. on the captured images. In S102, the board unit 120 to be operated is determined in accordance with the recognized type of the target object. In this case, several types of templates for detecting pictures and detecting sculptures are registered preliminarily, and the board units 120 to be operated are associated for each type.

For example, regarding the target object such as the picture, it is generally determined that the lower part of the 3-D data is unnecessary. As a result, if the target object is categorized as the picture type, it is determined that the board unit 120 in the bottom board frame 116B is inactive and the board unit 120 in the top board frame 116T is active. Consequently, the image capture units 126 and the lighting units 128 included in the board unit 120 in the bottom board frame 116B are not operated, and the image capture units 126 and the lighting units 128 in the board unit 120 in the top board frame 116T are operated.

In S103, the calculation controller 194 transfers the control data to the board unit 120 to operate the part of the image capture units 126 and the lighting units 128 in the board unit 120 determined to be operated, and the part of the image capture units 126 and the lighting units 128 become active. In S104, 3-D shape is measured roughly by operating the part of the image capture units 126 and the lighting units 128 in the determined board unit 120. The purpose of the part of the image capture units 126 and the lighting units 128 is to measure the shape roughly. For example, it is possible to use the image capture unit 126 and the lighting unit 128 in the center of the board units 120. It should be noted that the image capture units 126 and the lighting units 128 operated in measuring the rough 3-D shape can be selected to provide approximately uniform density. As a result, it is possible to acquire data to determine the units to be operated effectively.

In steps S105 to S108, the image capture units 126 and the lighting units 128 in the board unit 120 to be operated in the actual measurement finally are determined for each board unit 120 based on the acquired rough 3-D data.

In S105, the 3-D data analyzer 154 in the board unit 120 analyzes the acquired rough 3-D data. Here, it is desired to perform basic calculation to calculate the number of image capture units 126 and the lighting units 128 to be operated only. In S106, it is determined whether or not the part of the target object that the board unit 120 involves has the complex 3-D shape. If it is determined that the part of the target object has the complex 3-D shape (YES in S106), the process proceeds to S107.

In S107, the 3-D data analyzer 154 in the board unit 120 determines that the image capture units 126 and the lighting units 128 predefined in a detail set are to be operated and instructs them to operate. The detail set contains a set of the image capture units 126 and the lighting units 128 predefined to perform the detailed measurement if the complex 3-D shape is contained in the involved area. For example, all of the image capture units 126 and the lighting units 128 in the board unit 120 can be contained in the detail set.

By contrast, if it is determined that the part of the target object does not have the complex 3-D shape (NO in S106), the process proceeds to S108. In S108, the 3-D data analyzer 154 in the board unit 120 determines that the image capture units 126 and the lighting units 128 predefined in a standard set are to be operated and instructs them to operate. The standard set contains a set of the image capture units 126 and the lighting units 128 predefined to perform the measurement cutting waste if the complex 3-D shape is not contained in the involved area. Typically, fewer than all of the image capture units 126 and the lighting units 128 in the board unit 120 can be contained in the standard set.

In S109, the actual 3-D shape measurement is performed using one or more image capture units 126 and one or more lighting units 128 operated in S107 or S108 for each board unit 120. In S110, the calculation controller 194 calculates the 3-D shape of the target object based on the 3-D data captured by one or more operated image capture units 126 and generates the 3-D model, and the process ends.

For example, a case that a picture as the target object is produced using materials for oil painting and contains the complex 3-D shape on its surface is taken as an example. In the process flow described above, first, the 3-D data with rough density is acquired using fewer than all of the image capture units 126 and the lighting units 128 (e.g., only the center ones are used) in the board unit 120 in S104. Subsequently, the 3-D data analyzer 154 performs the simple analysis in S105. After the analysis, if it is determined that the part of the target object contains the complex 3-D shape (YES in S106), it is possible to operate more image capture units 126 and more lighting units 128 included in the board unit 120 in S107.

In the example described above, the 3-D data analyzer 154 in the board unit 120 determines the image capture units 126 and the lighting units 128 to be operated finally. However, the 3-D data analyzer 154 can acquire the 3-D data captured by other board units 120 and their analysis results if desired and determine the units to be operated based on that information. Otherwise, it is possible that the calculation controller 194 that integrates data from all board units 120 determines the final number of units to be operated. That is, one or both of the 3-D data analyzer 154 and the calculation controller 194 can comprise a selecting unit that selects one or more image capture units and one or more lighting units to be operated in this embodiment.

In addition, the process in FIG. 8 is but an example thereof and is not limited thereto. For example, it is possible to perform rough measurement using a ToF camera that cannot acquire a high-density 3-D shape but can measure distance to the target object quickly. Since information on distance to the target object is recorded in pixels of a sensor in the ToF camera, it is possible to read rough change of the distance information from the distance image. For example, after analyzing the distance image, if it is determined that the distance information of the target area changes drastically and the 3-D shape is complex, it is possible to increase the number of the board units 120, the image capture units 126, and the lighting units 128 to capture images of the target area. By using cameras such as the ToF camera, it is possible to shorten process time in measuring the 3-D shape roughly.

In other cases, it is possible to acquire the rough 3-D data of the target object by emitting coding pattern light from the projector etc. and using space coding method, and it is also possible to acquire the rough 3-D data from the shade of the target object. It is possible to determine the image capture units 126 and the lighting units 128 to be operated in the actual measurement finally by using the rough 3-D data alone or the combination of the rough 3-D data.

A process that measures the 3-D shape is described in detail below. In a particular embodiment, to measure the 3-D shape, it is possible to adopt photometric stereo method that captures multiple images modifying lighting direction, uses characteristic that a surface of an object facing to the light source direction is captured brightly, and calculates normal direction of the object surface using difference in luminance observed for each pixel.

Figure 9A:
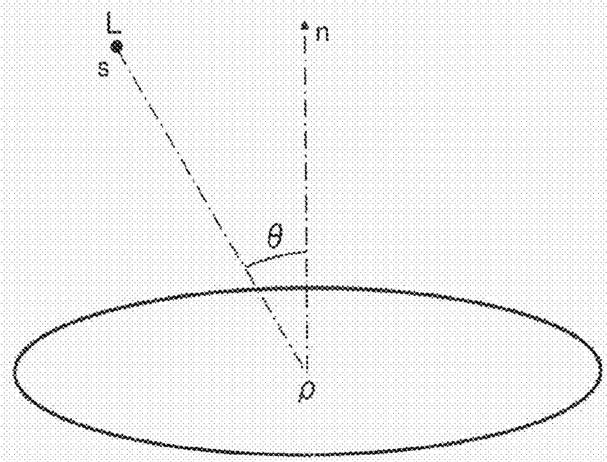
FIGS. 9A and 9B are diagrams illustrating 3-D shape measurement using an photometric stereo method as a specific embodiment.
Figure 9B:
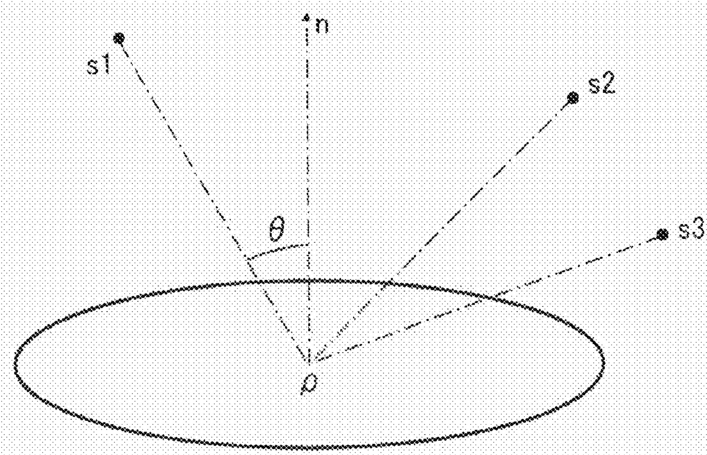

FIGS. 9A and 9B are diagrams illustrating 3-D shape measurement using the photometric stereo method in this specific embodiment. In the case of a Lambertian surface, brightness of an object is determined not by the angle from which the surface is observed but by intensity and location of a light source. As shown in FIG. 9A, in a case in which the light source from directions tilted at angle θ from the surface normal direction n illuminates the surface, the brightness of a surface observed in an image x can be expressed by Equation 1 below using light source intensity L and reflection coefficient of the object surface ρ.

$$x=\rho L\cos\theta \qquad \text{Equation 1}$$

Assuming 3-D unit vector that indicates the surface normal direction n' and 3-D unit vector that indicates the light source direction s', $x=\rho Ln'^{T}s'$ can be obtained from $\cos\theta=n'^{T}s'$. Furthermore, assuming multiplying the unit vector indicating the normal direction by reflection coefficient ρn' as n and multiplying the unit vector indicating the light source direction by intensity of the light source Ls' as s, it is possible to simplify the equation as described below.

$$x=n^{T}s \qquad \text{Equation 2}$$

Here, as shown in FIG. 9B, if the object is illuminated from three different light source directions s1, s2, and s3 sequentially and it is assumed that each observed brightness is x1, x2, and x3, vector $x=(x1, x2, x3)^{T}$ can be expressed as shown below.

$$x^{T}=n^{T}(s1,s2,s3)=n^{T}S \qquad \text{Equation 3}$$

As a result, assuming that the light source vector as the light source direction and the light source intensity are known, 3 by 3 matrix S is known, and it is possible to acquire surface normal vector N by multiplying both sides of Equation 3 by inverse matrix $S^{-1}$.

$$N^{T}=x^{T}S^{-1} \qquad \text{Equation 4}$$

By performing the calculation described above for all pixels in the input image, it is possible to estimate the surface normal vectors at all points on the object surface, i.e., the normal direction and reflection coefficient. If the surface normal vectors at all points on the object surface are determined, it is possible to acquire the 3-D shape of the object using the fact that surface direction corresponds to the surface normal vector at each point on the object surface.

Figure 10:
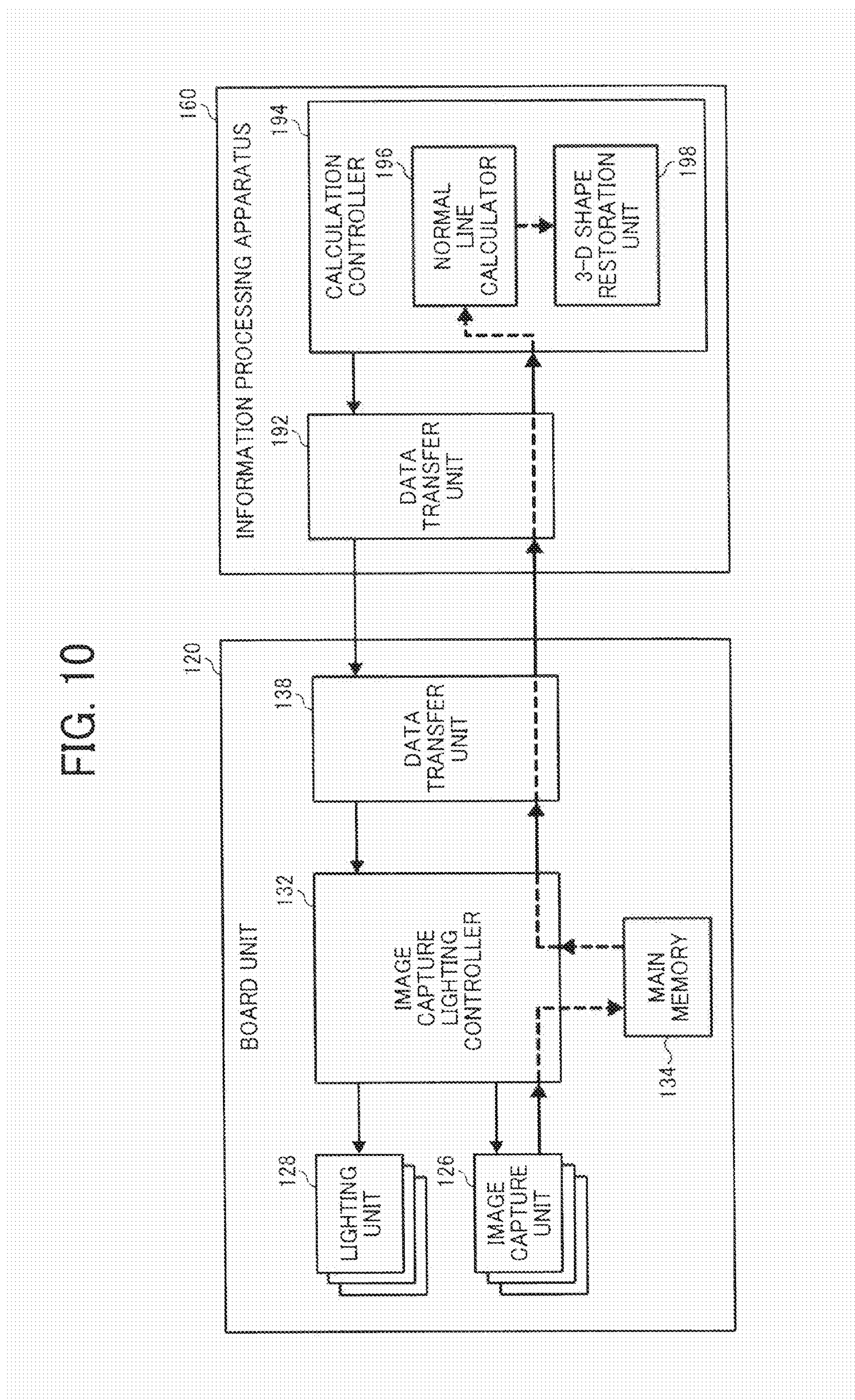
FIG. 10 is a diagram illustrating main components and data flow regarding 3-D shape measurement on each board unit of the 3-D shape capture apparatus and the information processing apparatus as a specific embodiment.

FIG. 10 is a diagram illustrating main components and data flow regarding 3-D shape measurement using photometric stereo method on each board unit of the 3-D shape capture apparatus and the information processing apparatus in a specific embodiment.

As shown in FIG. 9, in the photometric stereo method, images of the target object are captured by the image capture unit from one direction using more than three light source directions, and the 3-D shape of the target object is measured using the captured images. In the 3-D shape measurement using the photometric stereo method, under the control of the calculation controller 194, the image capture lighting controller 132 controls turning on and off the light source of the lighting unit 128, illuminates the target object to be measured with light, and instructs the image capture unit 126 to capture images. More than three captured images are transferred to the main memory 134 and written in the main memory 134 temporarily. Subsequently, the 3-D data is composed using them and transferred to the data transfer unit 192 in the subsequent information processing apparatus 160 via the data transfer unit 138. The transferred 3-D data (including more than three captured images) are read by the calculation controller 194.

The calculation controller 194 in FIG. 10 includes a normal line calculator 196 that calculates normal directions for each pixel using more than three captured images transferred by the board unit 120 as the 3-D data and a 3-D shape restoration unit 198 that restores the 3-D shape using the normal lines calculated for each pixel. The normal line calculator 196 and the 3-D shape restoration unit 198 comprise a shape calculator that calculates the 3-D shape of the target object based on the captured image information.

The embodiment that uses the photometric stereo method is described above. Furthermore, in other embodiments, a technology that acquires distance data at points on the target object using an autofocus adjustment mechanism in a camera used for capturing images of the target object to acquire coordinates at the points on the target object can be adopted.

Furthermore, in other embodiments, a technology that captures omnifocal images to resolve mismatch of focal points and capture images of the target object that has much vertical interval. As a result, it is possible to overcome fault of the normal photometric stereo method that precision of the 3-D shape measurement deteriorates due to the mismatch of focal points in case of capturing images of the target object that has vertical interval equal to or larger than depth of field.

Examples of a technology that captures omnifocal images are (1) a technology that generates omnifocal images using an Extended Depth of Field (EDoF) camera, (2) a technology that generates omnifocal images by sweeping focal points, and (3) a technology that generates omnifocal images by capturing multiple images changing focal points and performing image processing.

In the first technology described above, by using a special optical system, it is possible to capture the omnifocal image in one shot by performing image processing after capturing the image. In the second technology described above, by changing focal points while one image is captured, it is possible to capture a uniformly blurred image and generate an omnifocal image by eliminating the blur by performing image processing after capturing the image. In the third technology described above, by capturing images multiple times while changing focal points in each shot, it is possible to generate a single omnifocal image by performing image processing after capturing images.

However, in the first technology described above, it is desired to use the expensive dedicated optical system, and it is difficult to downsize the apparatus. In the second technology described above, it is desired to use the expensive mechanism that changes focal points at high speed while the image is captured, and generally, a low-resolution omnifocal image is acquired. In the third technology described above, since a generic camera can be used, it is possible to implement the apparatus itself at low cost. However, it is desired to capture large number of images changing focal points slightly, and it takes long time to capture the omnifocal image due to speed of the mechanism that changes the focal point. In addition, it takes cost and time to calculate focal points for all captured images and pixels.

A preferable embodiment of a 3-D measurement process that can overcome the faults described above, capture omnifocal images at low cost and low processing power without special mechanisms, and measure the target object with vertical intervals precisely is described in detail below.

Figure 11:
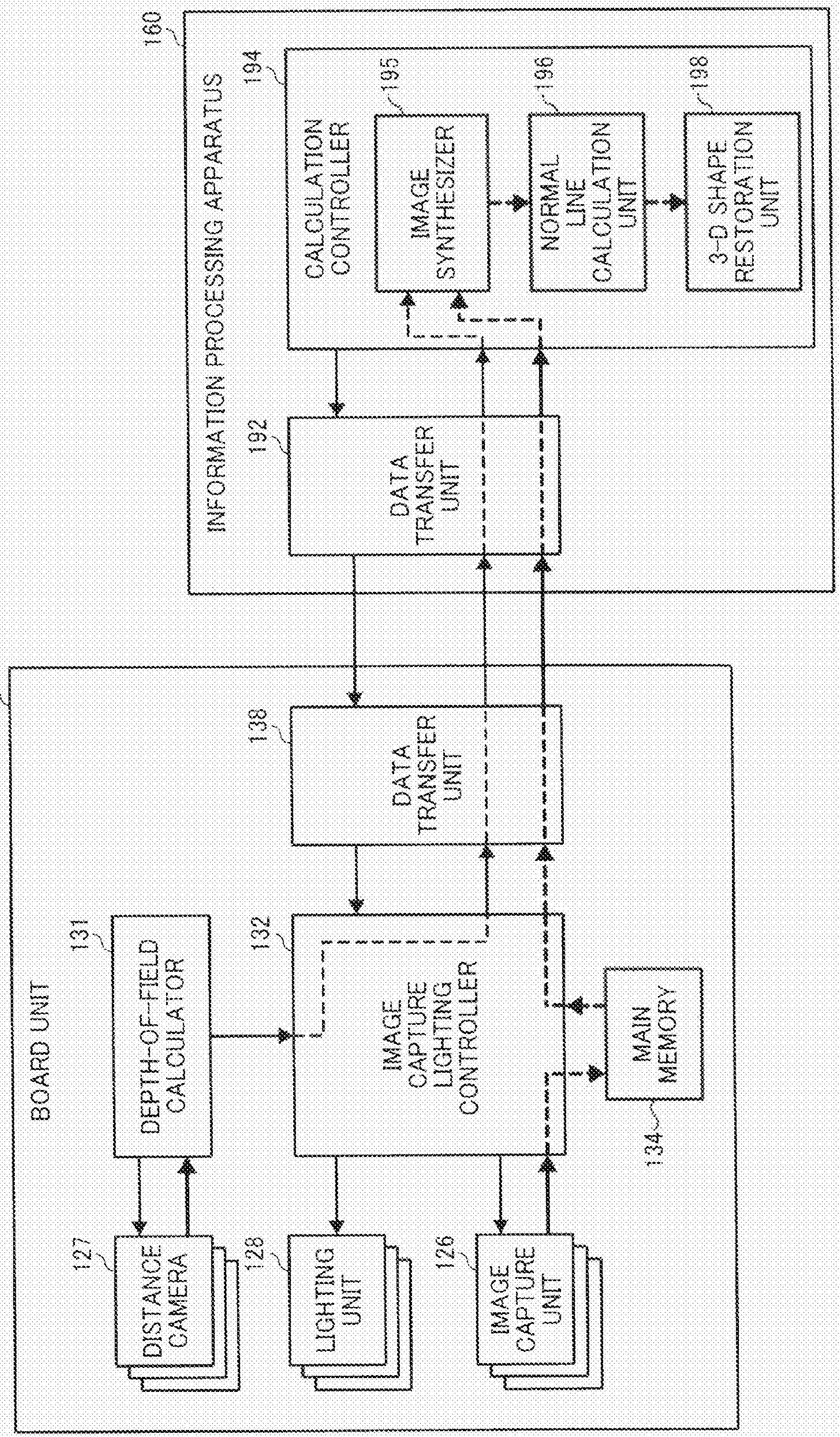
FIG. 11 is a diagram illustrating main components and data flow regarding 3-D shape measurement on each board unit of the 3-D shape capture apparatus and the information processing apparatus as a preferable embodiment.

FIG. 11 is a diagram illustrating main components and data flow regarding 3-D shape restoration using extended photometric stereo method on each board unit of the 3-D shape capture apparatus and the information processing apparatus in a preferable embodiment. In FIG. 11, in addition to the configuration in FIG. 10, a distance camera 127 that measures rough 3-D shape of the target object to be measured and a depth-of-field calculator 131 that calculates depth of field based on the rough 3-D shape data of the target object acquired by the distance camera 127 are included. The distance camera 127 and the depth-of-field calculator 131 can be located on the board unit 120 typically, but they are not limited to that. The ToF camera described above can be adopted as the distance camera 127 to configure an acquisition unit that acquires rough 3-D shape in this embodiment. The depth-of-field calculator 131 configures a calculation unit in this embodiment.

Based on the data from the depth-of-field calculator 131, the image capture lighting controller 132 in FIG. 11 cooperate with the calculation controller 194, controls turning on and off the light source of the lighting unit 128, controls the focal point of the image capture unit 126, and captures images using the image capture unit 126.

Multiple captured images changing focal points for each of multiple light source direction are transferred to the main memory 134 and written in the main memory 134 temporarily. Subsequently, the 3-D data is composed using them and transferred to the data transfer unit 192 in the subsequent information processing apparatus 160 via the data transfer unit 138. The transferred 3-D data (including multiple captured images for each of multiple light source directions) are read by the calculation controller 194.

The calculation controller 194 includes an image synthesizer 195, a normal line calculator 196, and a 3-D shape restoration unit 198. After capturing multiple images changing focal points for one light source direction, the image synthesizer 195 synthesizes captured images to create one omnifocal image. The normal line calculator 196 in FIG. 11 calculates normal directions for each pixel using equal to or more than three omnifocal images corresponding to equal to or more than three directions. The 3-D shape restoration unit 198 restores the 3-D shape using calculated normal lines for each pixel. The image synthesizer 195, the normal line calculator 196, and the 3-D shape restoration unit 198 comprise a shape calculator that calculates the 3-D shape of the target object based on the captured image information.

Figure 12A:
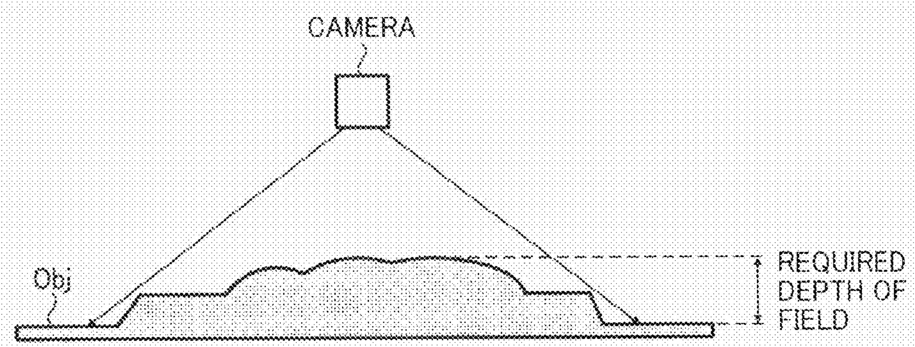
FIG. 12A is a diagram illustrating desired depth-of-field.

FIG. 12A is a diagram illustrating depth-of-field desired in capturing images of the target object appropriately. The depth of field means a forward and backward range that looks in-focus around the focal point. The depth of field is determined by an f number, focal length of a lens, and object distance (distance between the target object obj and the camera). Basically, as the f number of the lens gets smaller, the depth of field gets shallower, and as the f number of the lens gets larger, the depth of field gets deeper. As the focal length of the lens gets longer, the depth of field gets shallower, and as the focal length of the lens gets shorter, the depth of field gets deeper. Furthermore, as the object distance gets shorter, the depth of field gets shallower, and the object distance gets longer, the depth of field gets deeper. More specifically, the depth of field can be expressed using following equations.

Equations 5

$$\text{anterior depth of field (mm)} = \frac{\text{allowable circle of confusion diameter (mm)} \times f\ \text{number} \times \text{target distance (mm)}^2}{\text{focal distance (mm)}^2 + \text{allowable circle of confusion diameter (mm)} \times f\ \text{number} \times \text{target distance (mm)}^2}$$

$$\text{posterior depth of field (mm)} = \frac{\text{allowable circle of confusion diameter (mm)} \times f\ \text{number} \times \text{target distance (mm)}^2}{\text{focal distance (mm)}^2 - \text{allowable circle of confusion diameter (mm)} \times f\ \text{number} \times \text{target distance (mm)}^2}$$

$$\text{depth of field} = \text{anterior depth of field} + \text{posterior depth of field}$$

Regarding the relationship between the target object obj and the depth of field, in measuring 3-D shape using the photometric stereo method, as shown in FIG. 12A, it is desired that the depth of field of the camera in the image capture unit 126 is deeper than the height of the target object obj. If the depth of field of the camera is shallower than the height of the target object obj, the part of the target object gets out of focus, and the image gets blurred.

Generic cameras used as camera modules for mobile phones are compact, high-resolution, and reasonable, and it is also useful for the photometric stereo method. However, the generic camera modules for mobile phones cannot change the f number and the focal length. In addition, the f number trends toward smaller recently, and it is demanded to make the object distance shorter for downsizing. As a result, the depth of field trends toward shallower.

Figure 12B:
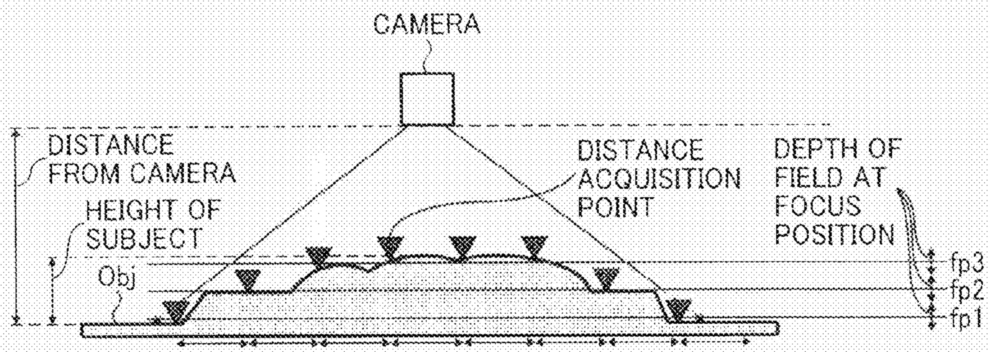
FIG. 12B is a diagram illustrating multiple image captures a multiple focus positions.

To cope with this issue, in the preferable embodiment, images of the target object obj are captured multiple times using the distance camera 127. FIG. 12B is a diagram illustrating multiple image captured multiple times using the distance camera in the preferable embodiment. The distance camera 127 that acquire the distance data has become popular, and it is possible to purchase small ones at low cost. However, regarding the distance data acquired by the generic distance camera, since the generic distance cameras are low-resolution compared to the normal camera modules, the acquired 3-D shape becomes low-resolution. Therefore, in this preferable embodiment, first, the rough 3-D shape of the target object obj is acquired using the distance camera

127. Subsequently, images are captured multiple times using the image capture unit 126 to measure the final 3-D shape of the target object obj.

FIG. 13 is a flowchart illustrating an image capture process for an omnifocal image executed by the 3-D shape capture apparatus 110 in the preferable embodiment. It should be noted that the process shown in FIG. 13 corresponds to a process that generates one omnifocal image from multiple images captured changing focal points in one light source direction. In addition, in this embodiment, as a matter of description convenience, the same camera that has both distance camera capabilities and normal camera capabilities is used as the distance camera 127 and the image capture unit 126 used for capturing images. However, that is not limited to the example, and different cameras can be used for the distance camera and the image capture unit 126.

After the process in FIG. 13 starts, as shown in FIG. 12B, the 3-D shape capture apparatus 110 acquires the approximate distance data using the distance camera 127 in S201. In FIG. 12B, triangle symbols (distance acquisition points) indicate points where the distance data is acquired. As described above, regarding the distance data, since it is difficult to acquire the data as high-resolution as the normal cameras, the 3-D shape measured subsequently also becomes rough. However, in the preferable embodiment, since it is desired that only distance from the camera to the mount (the bottom of the target object) and the height of the target object (height from the bottom of the target object to the top of the target object) in the visual field are acquired, it is possible to acquire the data at adequate precision using the generic distance camera.

In S202, in the 3-D shape capture apparatus 110, the depth-of-field calculator 131 calculates the distance from the distance camera 127 to the mount and the height of the target object. For example, if the acquisition range in the visual field by the distance camera 127 is within the mount scope only, it is possible to determine that the farthermost point from the distance camera 127 as the distance to the mount among rough multiple distance data acquired as described above. Similarly, in case of calculating the height of the target object, for example, if the acquisition range by the distance camera 127 is within the mount scope only, the nearest point from the distance camera 127 is extracted among the acquired approximate distance data. Subsequently, difference between the distance between the camera and the mount and the distance between the camera and the nearest point of the target object is calculated, and the acquired difference corresponds to the height of the target.

In steps after S203, based on the height of the target object and the parameters of the camera, the focal point of the camera in the image capture unit 126 that performs image capture is determined. In S203, in the 3-D shape capture apparatus 110, the depth-of-field calculator 131 calculates the depth of field based on information on the distance from the camera to the mount calculated from the rough 3-D shape, focal length of the camera known preliminarily, f number, and allowable circle of confusion. In S204, in the 3-D shape capture apparatus 110, the depth-of-field calculator 131 compares the calculated depth of field is equal to or larger than the height of the target object comparing the calculated height of the target object with the calculated depth of field.

If it is determined that the depth of field is equal to or larger than the height of the target object (YES in S204), the process proceeds to S205. In S205, in the 3-D shape capture apparatus 110, the depth-of-field calculator 131 determines the focal point so that all of the height of the target object fits into the depth of field of the camera. In S206, in the 3-D shape capture apparatus 110, the image capture lighting controller 132 captures one image in one light source direction just like the normal photometric stereo method, and the process ends.

By contrast, if it is determined that the height of the target object is larger than the depth of field (NO in S204), the process proceeds to S207. In S207, in the 3-D shape capture apparatus 110, the depth-of-field calculator 131 determines an initial focal point that the mount fits into the range within the depth of field of the camera based on the distance data to the mount where the target object obj is located. For example, a focal point fp1 in FIG. 12B corresponds to the initial focal point. In S208, in the 3-D shape capture apparatus 110, the image capture lighting controller 132 captures one image at the initial focal point for each light source direction. In this case, in-focus images for the part of the target object within the range of the depth of field at the focal point fp1 in FIG. 12 only, e.g., for the surrounding area at the right and left of the target object obj shown in FIG. 12B only, are captured In S209, in the 3-D shape capture apparatus 110, the depth-of-field calculator 131 determines whether or not all of the height of the target object has been covered by the past image captures. If it is determined that the height of the target object has not been covered (NO in S209), the process proceeds to S210.

In S210, in the 3-D shape capture apparatus 110, the depth-of-field calculator 131 calculates focal point and depth of field again considering the front end of the depth of field at the previous focal point as the distance to the target object. More specifically, (previous distance from the camera to the mount)—(the depth of field at the previous focal point) is substituted for new distance from the camera to the mount, and (previous height of the target object)−(the depth of field at the previous focal point) is substituted for new height of the target object. Subsequently, similarly, the depth of field is calculated based on information on the focal length of the camera known preliminarily, f number, and allowable circle of confusion again.

In the case of FIG. 12B, after the first recalculation subsequent to the focal point fp1, focal point fp2 and its depth of field are calculated as described above. In S208, in the 3-D shape capture apparatus 110, the image capture lighting controller 132 captures the image for one light source direction for the second time. In this case, the in-focus image is captured for the area sandwiched by the center part and the surrounding area of the target object obj only.

In FIG. 12B, in-focus images for the surrounding area of the target object obj and the area sandwiched by the center part and the surrounding area of the target object obj are captured by the first and second image capture, and the center part of the target object is remaining. As a result, after the first recalculation, in S209, the process proceeds to S210. In S210, a focal point fp3 in FIG. 12B and its depth of field are calculated, and the image is captured for the light source direction for the third time in S208. In FIG. 12B, since the height of the target object can be covered by the depth of field at the focal point fp3, it is determined that the height of the target object can be covered after the second recalculation subsequent to the focal point fp2 (YES in S209), and it is finished to capture images for the light source direction for one point.

Since the camera direction remains unchanged even if the light source direction is changed, it is possible to determine the focal point and the number of image-capturing times using the previous calculation result in capturing images for the subsequent light source direction.

Figure 12C:
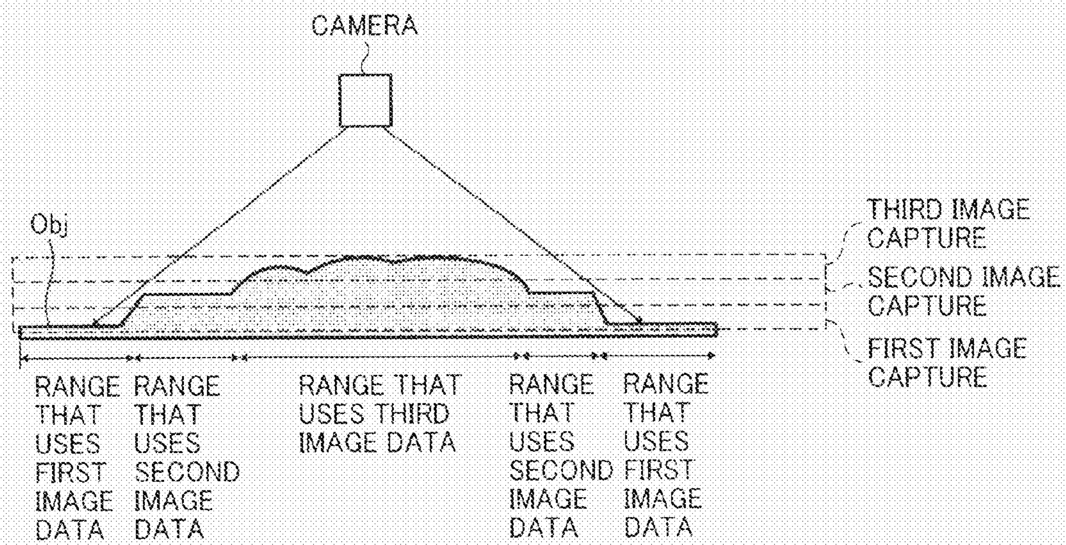
FIG. 12C is a diagram illustrating synthesis of images captured multiple times.

A process of synthesizing multiple images captured changing the focal points is described in detail below with reference to FIG. 12C and a flowchart in FIG. 13. FIG. 12C is a diagram illustrating synthesis of images captured multiple times. In a specific embodiment, the process in FIG. 12C is executed by the information processing apparatus 160. However, it is still possible to execute the process by the board unit 120.

Regarding the process of synthesizing captured images changing the focal points multiple times, after dividing images captured multiple times into areas, an image with the highest contrast is determined for each area, and a pixel value of the image for each area is considered as a pixel value for the synthesized image. However, in the method described above, if there is fewer than all of the target object with vertical interval within the divided area, it is possible that the synthesis is not performed appropriately. While it is also possible to divide the area into fine areas corresponding to the vertical interval, that results in increasing processing load for calculating contrast and increasing calculation cost.

Therefore, in the preferable embodiment, the image synthesis is performed base on the rough 3-D data acquired preliminarily. The image synthesis based on the rough 3-D data acquired preliminarily is described below in detail.

In this embodiment, first, the image synthesizer 195 calculates distances to each pixel based on the approximate distance data acquired by the distance sensor. If the distance data corresponding to each pixel in the resolution of the synthesized image is not found due to the approximate distance data, the distance data for each pixel is calculated performing calculation based on distance data at surrounding pixel. Examples of calculation method are the nearest interpolation that acquires distance data from the nearest pixel and the bi-linear interpolation that performs weighed calculation using multiple surrounding pixels with distance data in accordance with the distance and determines distance.

After calculating the distance data for each pixel, the image synthesizer 135 generates the omnifocal image by using pixel value of an image captured at focal point and depth of field corresponding to the calculated distance data preferentially among multiple captured images for each pixel.

For example, assuming the focal point in the first image capture is 20 cm and the depth of field is 15 cm to 25 cm, if the distance data of a pixel is within 15 cm to 25 cm, the pixel value of the image captured in the first image capture is used preferentially. Assuming the focal point in the second image capture is 10 cm and the depth of field is 7 cm to 15 cm, if the distance data of a pixel is within 7 cm to 15 cm, the pixel value of the image captured in the second image capture is used preferentially. As described above, it is determined which pixel value of a captured image is used as the pixel value of the synthesized image preferentially based on the distance data for all pixels. After finishing the synthesizing process for all pixels, the omnifocal image that is in-focus for all pixel values can be acquired.

In the embodiment described above, pixel values of the captured image corresponding to the focal point and depth of field whose distance data matches are used as is. However, in other embodiments, methods that use pixel values of a corresponding captured image such as weighting pixel values of the corresponding captured image and calculating weighted average among multiple captured image can be adopted.

By performing the process described above with reference to FIGS. 12 and 13, it is possible to acquire the omnifocal image in one light source direction. Subsequently, by performing the process for multiple light source directions, it is possible to acquire multiple omnifocal images. By adopting the photometric stereo method using equal to or more than three omnifocal images, it is possible to estimate surface normal vectors, i.e., normal line directions and reflection coefficients at all points in the field of vision. If the surface normal vectors at all points in the field of vision are determined, it is possible to acquire the 3-D shape of the target object in the field of vision using the fact that surface direction corresponds to the surface normal vector at each point on the object surface. Furthermore, by integrating 3-D shape information at multiple viewpoints measured by each of multiple board units 120 based on positional relationship between the board units 120, it is possible to restore a high-definition 3-D shape of the target object.

In the embodiments described above, it is possible to provide the shape measurement system and the shape measurement apparatus that can measure the 3-D shape of the target object at high precision effectively from all directions.

By adopting the configuration described above, it is possible to locate all image capture units 126 and all lighting units 128 at equal distance from the target object at uniform density, and it is possible to perform measurement from all directions. Furthermore, in the embodiments described above, since it is possible to control the capture image units 126 and the lighting units 128 to be operated in accordance with the target object, it is possible to operate the necessity minimum image capture units and lighting units depending characteristic of the target object to optimize the measurement, shorten the measurement time, and reduce the power consumption.

In the preferable embodiments described above, based on the approximate distance data acquired by the distance sensor, it is possible to determine which pixel values can be used for the image synthesis among multiple captured images without complicated calculations. In the preferable embodiments described above, since it is possible to calculate the focal points to be configured based on the rough 3-D shape, it is possible to minimize the number of captured images. Furthermore, since it is possible to synthesize the multiple images captured based on the rough 3-D data in units of pixels easily, it is possible to reduce the calculation cost and calculation time for the image synthesis. As a result, it is possible to capture omnifocal images at low cost and low processing load without a special mechanism and measure the target object having much vertical interval precisely.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Fewer than all of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

The present invention also encompasses a non-transitory recording medium storing a program that executes a shape measurement method. The shape measurement method, performed by processing function proposing apparatus, includes the steps of providing one or more lighting units in a case, the one or more lighting unit capable of illuminating a target object located in the case, providing one or more image capture units in the case, the one or more image capture unit capable of capturing an image of the target object, holding the image capture units and the lighting units so as to form a polyhedron shape approximating a sphere, selecting at least one of the image capture units and at least one of the lighting units to be operated, and calculating a 3-D shape of the target object based on image data captured by the selected image capture unit under light emitted by the selected lighting unit.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A shape measurement system, comprising:

one or more lighting units located in a case configured to illuminate a target object located in the case;

one or more image capture units located in the case configured to capture an image of the target object;

a holding unit to hold the image capture units and the lighting units so as to form a polyhedron shape approximating a sphere;

a selector to select at least one of the image capture units and at least one of the lighting units to be operated; and a shape calculator to calculate a 3-D shape of the target object based on image data captured by the selected image capture unit under light emitted by the selected lighting unit.

2. The shape measurement system according to claim 1, wherein the selector selects the at least one image capture unit and the at least one lighting unit to be operated based on an analysis result acquired by operating a part of the image capture units and the lighting units.

3. The shape measurement system according to claim 2, wherein the image capture units and the lighting units are selected so that the selected image capture units and the selected lighting units provide approximately uniform density.

4. The shape measurement system according to claim 2, wherein the one or more image capture units include at least one image capture unit configured to acquire a distance image, and the selector selects the at least one image capture unit and the at least one lighting unit to be operated based on an analysis result of the distance image.

5. The shape measurement system according to claim 1, wherein the selector selects the at least one image capture unit and the at least one lighting unit to be operated based on a user-implemented configuration.

6. The shape measurement system according to claim 1, wherein the selector selects the image capture unit and the lighting unit to be operated based on an image recognition result of the target object.

7. The shape measurement system according to claim 1, wherein at least one of the lighting units includes multiple lighting elements that emit light of different wavelengths, different luminous intensities, or both different wavelengths and luminous intensities.

8. The shape measurement system according to claim 1, further comprising:

an acquisition unit to acquire a rough 3-D shape of the target object;

a calculator to calculate a focal point and depth of field at the focal point in capturing an image multiple times using the one or more image capturing units for each light source direction of one or more lighting units based on the rough 3-D shape;

a synthesizer to synthesize an omnifocal image for each light source direction of the one or more lighting units based on multiple image data captured at different focal points and different depth of field; and a restoration unit to restore the 3-D shape of the target object based on the omnifocal image for each of multiple light source directions.

9. The shape measurement system according to claim 8, wherein the calculator calculates focal points at multiple image capture operations based on the rough 3-D shape so as to cover a height of the target object in a predetermined field of vision.

10. The shape measurement system according to claim 8, wherein the synthesizer calculates distance data at each pixel of the omnifocal image to be synthesized and acquires the omnifocal image by using a pixel value of the image data captured at the focal point and depth of field corresponding to the calculated distance data among the multiple image data.

11. The shape measurement system according to claim 1, wherein the polyhedron shape approximating the sphere has a shape generated by dividing a polyline comprising an uniform polyhedron into two or more pieces, the shape measurement system further comprising:

one or both of image capture units and one or more lighting units;

a calculating unit to control one or both of the image capture units and the lighting units;

a main memory to provide a work area for the calculating unit; and a communication unit to communicate with the shape calculator, wherein the shape measurement system comprises multiple board units to cover sides of the polyline generated by the division.

12. An image capture apparatus, comprising:

a case;

one or more lighting units located in the case that illuminate a target object located in the case;

one or more image capture units located in the case that capture an image of the target object;

a holding unit to hold the image capture units and the lighting units so as to form a polyhedron shape approximating a sphere;

a selector to select at least one of the image capture units and at least one of the lighting units to be operated; and an output unit to output image data captured by the selected image capture unit.

13. The image capture apparatus according to claim 12, wherein the case includes a lightproof dome including two hemispheres fitted together and containing the holding unit, the lightproof dome having an inner surface treated to reduce inside reflection of light.

14. A method of measuring a shape, comprising the steps of:

providing one or more lighting units in a case, the one or more lighting unit capable of illuminating a target object located in the case;

providing one or more image capture units in the case, the one or more image capture unit capable of capturing an image of the target object;

holding the image capture units and the lighting units so as to form a polyhedron shape approximating a sphere;

selecting at least one of the image capture units and at least one of the lighting units to be operated; and calculating a 3-D shape of the target object based on image data captured by the selected image capture unit under light emitted by the selected lighting unit.

* * * * *